(12) United States Patent
Wang et al.

(10) Patent No.: US 10,297,014 B2
(45) Date of Patent: May 21, 2019

(54) IMAGE PROCESSING DEVICE, MONITORING SYSTEM PROVIDED WITH SAME, AND IMAGE PROCESSING METHOD

(71) Applicant: PANASONIC INTELLECTUAL PROPERTY MANAGEMENT CO., LTD., Osaka (JP)

(72) Inventors: Qinhe Wang, Kanagawa (JP); Kuniaki Isogai, Tokyo (JP); Yoshiyuki Matsuyama, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/548,224

(22) PCT Filed: Feb. 17, 2016

(86) PCT No.: PCT/JP2016/000812
§ 371 (c)(1),
(2) Date: Aug. 2, 2017

(87) PCT Pub. No.: WO2016/152007
PCT Pub. Date: Sep. 29, 2016

(65) Prior Publication Data
US 2018/0033120 A1   Feb. 1, 2018

(30) Foreign Application Priority Data

Mar. 25, 2015 (JP) .................. 2015-062570
Mar. 25, 2015 (JP) .................. 2015-062576
Mar. 27, 2015 (JP) .................. 2015-065649

(51) Int. Cl.
*G06T 5/00* (2006.01)
*H04N 5/217* (2011.01)
(Continued)

(52) U.S. Cl.
CPC .......... *G06T 5/003* (2013.01); *G06K 9/4604* (2013.01); *G06T 7/20* (2013.01); *G06T 11/60* (2013.01);
(Continued)

(58) Field of Classification Search
CPC .......... G06T 5/003; G06T 7/20; H04N 5/217; G07C 5/00; G06K 9/4604
See application file for complete search history.

(56) References Cited

U.S. PATENT DOCUMENTS

2006/0061658 A1*  3/2006  Faulkner ............ H04N 5/23248
                                                  348/207.1
2010/0253793 A1   10/2010  Auberger et al.
(Continued)

FOREIGN PATENT DOCUMENTS

JP    10-206559    8/1998
JP    2000-115763  4/2000
(Continued)

OTHER PUBLICATIONS

International Search Report with Written Opinion issued in WIPO Patent Application No. PCT/JP2016/000812, dated Apr. 26, 2016.

*Primary Examiner* — Ahmed A Berhan
(74) *Attorney, Agent, or Firm* — Greenblum & Bernstein, P.L.C.

(57) ABSTRACT

Provided is an image processing device that removes noise caused by disturbance during image capture from a captured image by image processing, the image processing device includes an image input unit to which a plurality of temporally continuous captured images are input, an image feature extraction unit that extracts features related to the disturbance in the captured images, and an image sharpening unit that performs image processing based on the features related to the disturbance to thereby remove noise in the captured images. Further, the image processing device may further include mode switching means for switching between a monitoring mode for performing image processing based on the features related to the disturbance and a normal mode for
(Continued)

preventing the image processing based on the features related to the disturbance from being performed.

26 Claims, 25 Drawing Sheets

(51) Int. Cl.

| | | |
|---|---|---|
| *G06K 9/46* | (2006.01) | |
| *G06T 7/20* | (2017.01) | |
| *G06T 11/60* | (2006.01) | |
| *G07C 5/00* | (2006.01) | |
| *G07C 5/08* | (2006.01) | |
| *B60R 11/00* | (2006.01) | |
| *B60R 11/04* | (2006.01) | |

(52) U.S. Cl.
CPC .............. *G07C 5/00* (2013.01); *H04N 5/217* (2013.01); *B60R 11/04* (2013.01); *B60R 2011/0026* (2013.01); *G06T 2207/20216* (2013.01); *G07C 5/0866* (2013.01)

(56) References Cited

U.S. PATENT DOCUMENTS

| | | |
|---|---|---|
| 2011/0297978 A1 | 12/2011 | Takeuchi et al. |
| 2012/0327254 A1 | 12/2012 | Iwahashi |
| 2015/0172814 A1* | 6/2015 | Usher .................... H04R 3/005 |
| | | 381/92 |

FOREIGN PATENT DOCUMENTS

| | | |
|---|---|---|
| JP | 3439669 B2 | 6/2003 |
| JP | 2006-510282 | 3/2006 |
| JP | 2009-505477 | 2/2009 |
| JP | 2011-188332 | 9/2011 |
| JP | 2014-038051 | 2/2014 |

* cited by examiner

FIG. 12

| IMAGE PROCESSING RESULT | | SOUND PROCESSING RESULT | | WEATHER CONDITION DETERMINATION RESULT |
|---|---|---|---|---|
| DETERMINATION ITEM | RESULT | DETERMINATION ITEM | RESULT | |
| INSTANTANEOUS PIXEL BRIGHTNESS CHANGE | UNDETECTED | RAINFALL FEATURE SOUND | UNDETECTED | RAINFALL, HAILSTORM, AND THUNDERCLAP HAVE NOT BEEN DETECTED |
| | UNDETECTED | | DETECTED | RAINFALL HAS BEEN DETECTED |
| | DETECTED | | UNDETECTED | SNOWFALL HAS BEEN DETECTED |
| | DETECTED | | DETECTED | RAINFALL HAS BEEN DETECTED |
| | UNDETECTED | HAILSTORM FEATURE SOUND | UNDETECTED | RAINFALL, HAILSTORM, AND THUNDERCLAP HAVE NOT BEEN DETECTED |
| | UNDETECTED | | DETECTED | HAILSTORM HAS BEEN DETECTED |
| | DETECTED | | UNDETECTED | SNOWFALL HAS BEEN DETECTED |
| | DETECTED | | DETECTED | HAILSTORM HAS BEEN DETECTED |
| GENERATION OF SCREEN FLASH | UNDETECTED | THUNDERCLAP FEATURE SOUND | UNDETECTED | THUNDER HAS NOT BEEN DETECTED |
| | UNDETECTED | | DETECTED | THUNDER HAS BEEN DETECTED |
| | DETECTED | | UNDETECTED | THUNDER HAS BEEN DETECTED |
| | DETECTED | | DETECTED | THUNDER HAS BEEN DETECTED |

IMAGE PROCESSING DEVICE, MONITORING SYSTEM PROVIDED WITH SAME, AND IMAGE PROCESSING METHOD

TECHNICAL FIELD

The present disclosure relates to an image processing device, a monitoring system provided with the same, and an image processing method.

BACKGROUND ART

In recent years, a vehicle-mounted camera referred to as a video recording type drive recorder has been mounted on an automobile. For example, the vehicle-mounted camera that captures an image of a road condition in front of a vehicle and records the image is mounted on the inner side of a front window in a case where the camera is not adaptable to outdoor use. In this manner, the vehicle-mounted camera mounted on the inner side of the front window captures an image in which a wiper blade intersects a screen in a case where a wiper device is operated.

For example, when the wiper blade is captured as a visual field obstacle that erases a white line to be captured in a case where the white line in the road is detected by image processing and traveling support enabling traveling along a traffic lane is performed, it may be difficult to detect the white line. In a case where an image captured by a guard or the like who goes round, a vehicle, a person, or the like to be noticed is obstructed due to the motion of the wiper blade, which leads to a concern for a reduction in concentration.

Even in a case of a monitoring camera installed outdoors, snow passing a screen during snowfall acts as a visual field obstacle that erases a portion of scenery to be captured, and thus there is a problem in that it is not possible to clearly show a necessary portion of an image. Regarding the snow during snowfall, image data equivalent to one frame is constructed by performing comparison between gray scales of respective pixels of images in a plurality of frames prior to a target frame by using the images of the plurality of frames traced back frontward in a time axis from the target frame to be processed, and collecting pixels ranging from a pixel having the highest grayscale to a pixel having a grayscale at a predetermined position in order (for example, see PTL 1).

According to PTL 1 described above, in an image obtained by capturing a visual field obstacle, a pixel having a grayscale at a predetermined position in order in pixels of a plurality of frames is used as a pixel constituting the visual field obstacle. Thereby, the pixel of the visual field obstacle is not used, and thus it is possible to remove the visual field obstacle. Accordingly, it is considered that image processing disclosed in PTL 1 described above is applied to the reflection of the wiper blade in the vehicle-mounted camera.

However, in a case of the vehicle-mounted camera, scenery, another vehicle, or the like which relatively moves by the traveling of the vehicle serves as a moving subject. The image processing disclosed in PTL 1 described above being performed on an image obtained by the vehicle-mounted camera also affects a moving subject such as scenery or another vehicle, and thus there is a problem of afterimage tear in the moving subject to be captured or partial disappearance.

When a monitoring camera or the like capturing an image of an outdoor subject performs image capture during snowfall, a captured image in which a subject to be monitored is unclear due to a visual field blocked by snow particles is obtained. Consequently, for example, there has been known a technique for removing snowfall noise by performing median filtering in a time-axis direction on a plurality of temporally continuous captured images to thereby sharpen the images (see PTL 2). This technique focuses on the fact that there is a low possibility of pixels having the same coordinates in the plurality of temporally continuous captured images being pixels representing snow particles, and pixel values representing snow particles are excluded by median filtering in which pixels values extracted from the plurality of temporally continuous captured images are sorted in descending order to thereby acquire the median value. Therefore, it is possible to remove the snowfall noise.

There is a technique for detecting an outdoor weather condition such as snowfall regardless of a person's determination, and there has been a known weather display system which is provided with a plurality of sensors for obtaining weather information such as snowfall, rainfall, or the velocity of wind, processes the weather information obtained by the sensors, and displays the obtained weather information on weather display means provided indoors (see PTL 3).

Incidentally, there are some weather conditions, other than the above-described snowfall, in which noise may be generated during image capture performed outdoors. However, for example, in a case of image capture during rainfall, a noise generation condition in a captured image is different from that during snowfall. Accordingly, even when the image processing for removing snowfall noise which is disclosed in PTL 1 described above is applied as it is, it may be difficult to obtain the same noise removal effect as in the case of snowfall. Therefore, in order to more appropriately remove noise caused by a weather condition different from the captured image, it is preferable to apply different image processing depending on a weather condition during image capture (for example, to change a parameter related to the image processing.

Consequently, it is considered that image processing (noise removal) which is suited to each weather condition is performed on the basis of, for example, detection results of a plurality of sensors for detecting weather conditions. However, in this case, it is necessary to provide various sensors for each location where a camera is installed, and thus there is a problem in that time and labor are required for the installation of the sensors and a facility cost is also increased.

Further, there has been known a video camera including an optical or electronic image blur correction mechanism in order to suppress the generation of an uncomfortable video in which a video shown on a screen of a monitor is blurred during watching, for example, in a case where a photographer captures a moving image by using a handheld video camera. In the electronic image blur correction mechanism, image blur is solved by canceling a deviation of a subject by comparing a plurality of captured images with each other.

In order to prevent an image having been subjected to image blur correction from deviating from the screen, an image capture range of a light receiving element may be set to be wider than a range of an image shown on the screen. However, there is a problem in that the cost of the camera is increased due to the use of the high-resolution light receiving element or the size of the camera is increased due to the mounting of the large-size light receiving element. On the other hand, a security guard may perform monitoring by mounting a camera on the security guard's shoulder or head. In this case, there is a demand for promoting a reduction in the size of the camera and suppressing a reduction in resolution. In this case, it is considered that the resolution of a light receiving element and the resolution of an image shown on a screen are made to be substantially the same as each other by using the light receiving element having a small size.

However, in a case where the resolution of the light receiving element and the resolution of the image shown on the screen are made to be substantially the same as each other, the generation of an image in which a deviation of a subject is canceled by image blur correction may result in the occurrence of a deviation of the image with respect to the screen and the generation of a blank region which is not shown on the screen. Thereby, when a boundary between the image and the blank region becomes clear, the contour of the image acts as an edge, and thus there is a problem in that the edge is blurred and flickers in association with image blur. On the other hand, there has been a technique for preventing the blur of an edge from being shown by hiding a blank region together with the edge by using a mask with fixed concentration (see, for example, PTL 4).

There has been a technique for extracting a parallel movement vector and a rotation angle vector that indicate the motion of a camera due to image blur, separating an intended motion component and an unintended motion component from each other, performing filtering on the components, confirming whether or not the amount of correction performed on the image blur exceeds an allowable threshold value, and performing image blur correction so that the amount of correction falls within an allowable range when the amount of correction does not exceed the threshold value (see, for example, PTL 5).

However, in a case where image blur correction is performed by the shift of a captured image such that a subject is positioned in the middle portion of a screen, the mask is displayed in a peripheral portion of the screen like a frame. Accordingly, a display region of the correction image (captured image shown on the screen without being subjected to masking) becomes smaller, and thus there is a problem in that image display efficiency is decreased with respect to a case where an image is displayed on the entire screen. Particularly, in a case where blur in a rotation direction of an image is corrected, a region of a mask for hiding an edge is enlarged, and display efficiency is further decreased.

A blank region including the edge is compensated for by an image of a former frame, and thus it is possible to suppress the enlargement of a non-display region due to the mask for hiding the edge. However, in this case, when a moving image corrected in this manner is reproduced, the image of the former frame which is shown in the blank region is shown in a hardened state due to the occurrence of a delay with respect to the correction image of the present frame, which may result in a feeling of strangeness at the time of viewing the entire screen.

It is possible to cope with a problem in that display efficiency is decreased due to an image region of the screen, by enlarging the image region in the entire screen. However, in a case where an image to be displayed is displayed on the entire screen in an enlarged manner, a basic image is only enlarged. Thus, there is a concern that the definition of pixels of a correction image having been subjected to image blur correction may be decreased. Particularly, for example, there is a scene captured during walking at the time of recording a video for monitoring, which is unsuitable for a case where the definition of an image is required in order to confirm details from the recorded moving image, and an image of a portion processed as a blank region is not kept as a record.

When the amount of hand shake correction (a parallel movement vector or a rotation angle vector) is restricted so as not to exceed an allowable threshold value, image blur correction becomes insufficient with respect to handshake exceeding the threshold value. In this case, a blurred image is shown, which results in an uncomfortable video.

An object of the present disclosure is to be capable of removing noise caused by disturbance during image capture and to suppress afterimage tear in a moving subject other than the noise shown in an image, or partial disappearance.

More specifically, an object of the present disclosure is to be capable of removing a visual field obstacle appearing as disturbance and to suppress afterimage tear in a moving subject other than the visual field obstacle shown in an image, or partial disappearance.

More specifically, an object of the present disclosure is to be capable of determining a weather condition by a simple configuration during image capture performed outdoors and to be capable of acquiring an image from which noise is appropriately removed by image processing based on the determined weather condition.

Further, more specifically, an object of the present disclosure is to hold the resolution of an image corrected by electronic image blur correction and to prevent a video shown on a screen of a monitor from becoming unnatural.

CITATION LIST

Patent Literature

PTL 1: Japanese Patent Unexamined Publication No. 2000-115763
PTL 2: Japanese Patent No. 3439669
PTL 3: Japanese Patent Unexamined Publication No. 10-206559
PTL 4: PCT Japanese Translation Patent Publication No. 2006-510282
PTL 5: PCT Japanese Translation Patent Publication No. 2009-505477

SUMMARY OF THE INVENTION

An image processing device of the present disclosure is an image processing device that removes noise caused by disturbance during image capture from a captured image by image processing, the image processing device including an image input unit that receives inputs of a plurality of temporally continuous captured images, an image feature extraction unit that extracts a feature related to the disturbance in the captured image, and a disturbance suppression unit that suppresses influence of the disturbance on the captured image in accordance with the feature related to the disturbance.

An image processing method of the present disclosure is an image processing method of removing noise caused by disturbance during image capture from a captured image by image processing, the image processing method including an image input step of inputting a plurality of temporally continuous captured images, an image feature extraction step of extracting an image feature related to the disturbance in the captured image, and a disturbance suppression step of suppressing influence of the disturbance on the captured image in accordance with the feature related to the disturbance.

According to the present disclosure, it is possible to suppress the influence of the disturbance during image capture and to suppress afterimage tear in a moving subject other than the noise shown in an image, or partial disappearance.

More specifically, according to the present disclosure, it is possible to remove a visual field obstacle appearing as disturbance and to suppress afterimage tear in a moving subject other than the visual field obstacle shown in an image, or partial disappearance.

More specifically, according to the present disclosure, it is possible to determine a weather condition by a simple configuration during image capture performed outdoors and to acquire an image from which noise is appropriately removed by image processing based on the determined weather condition.

More specifically, according to the present disclosure, it is possible to hold the resolution of an image corrected by electronic image blur correction and to prevent a video shown on a screen of a monitor from becoming unnatural.

BRIEF DESCRIPTION OF DRAWINGS

FIG. 12 is a diagram illustrating an example of a weather condition determination table used by a weather determination unit in FIG. 11.

DESCRIPTION OF EMBODIMENTS

Hereinafter, exemplary embodiments of the present disclosure will be described with reference to the accompanying drawings.

(First Exemplary Embodiment)

Figure 1:
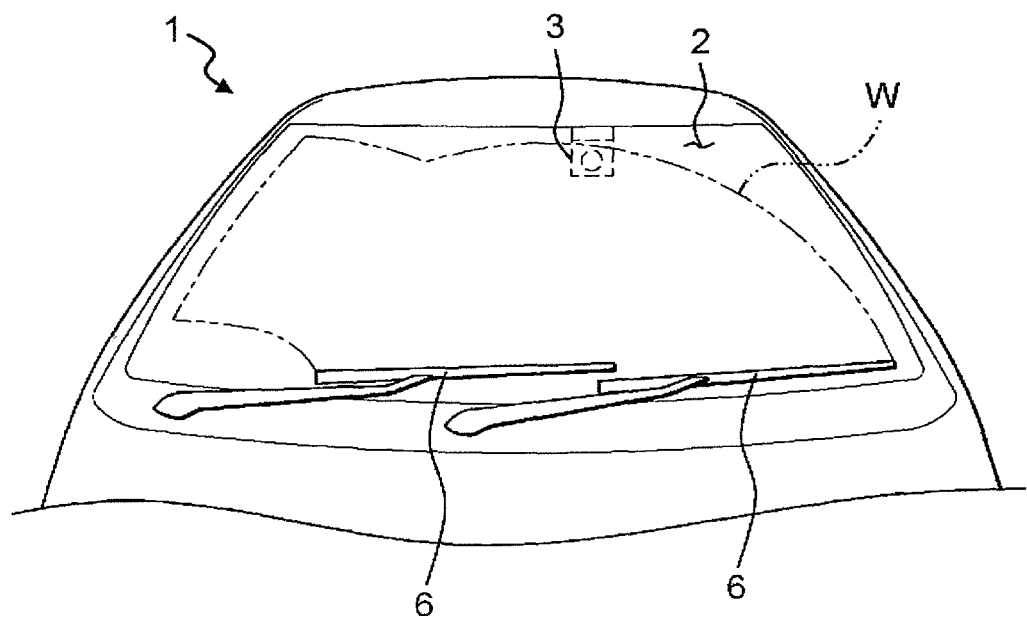
FIG. 1 is a diagram when a front window of an automobile is seen from the front side of the vehicle.

FIG. 1 is a diagram when front window 2 of automobile 1 is seen from the front side of the vehicle. Vehicle-mounted camera 3 capturing an image of the front side thereof through front window 2 is mounted at an appropriate location inside automobile 1. In this exemplary embodiment, an example in which a monitoring camera is used in a traveling monitoring vehicle will be described below. However, the present disclosure is not limited to the monitoring camera of the traveling monitoring vehicle, and can be also applied to, for example, a drive support system and an outdoor monitoring fixed camera.

Figure 2:
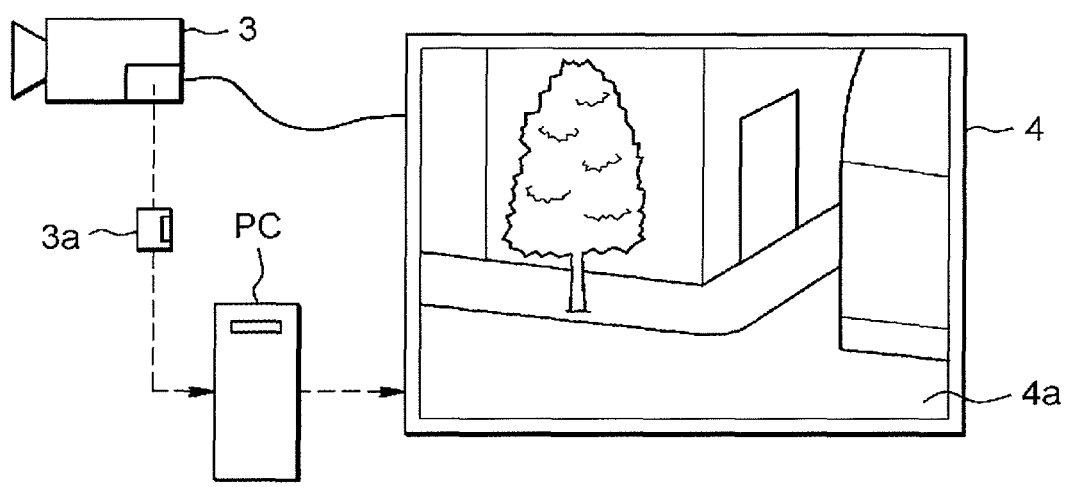
FIG. 2 is a schematic view illustrating an example of image capture performed by a vehicle-mounted camera to which the present disclosure is applied.

FIG. 2 illustrates a case where an image captured by vehicle-mounted camera 3 is shown on screen 4a of monitor 4 as a video by directly connecting vehicle-mounted camera 3 to monitor 4 or a case (a flow of a dashed line in the drawing) where image data of recording medium (memory card or the like) 4a mounted on vehicle-mounted camera 3 is read out by personal computer PC, is subjected to image processing, and is output to monitor 4 connected to personal computer PC. In any case, image processing shown on screen 4a may be known image processing, and a description thereof will be omitted. In addition, the present disclosure is not limited to a case of being shown on monitor 4, and may also be applied to a case of recording in a recorder.

Next, a control knack for image processing based on the first exemplary embodiment of the present disclosure will be described. This image processing is realized by, for example, a computer program, but is not limited to the computer program. A moving image shown on monitor 4 is generated by known frame processing, and is appropriately subjected to image processing based on the present disclosure.

Figure 3:
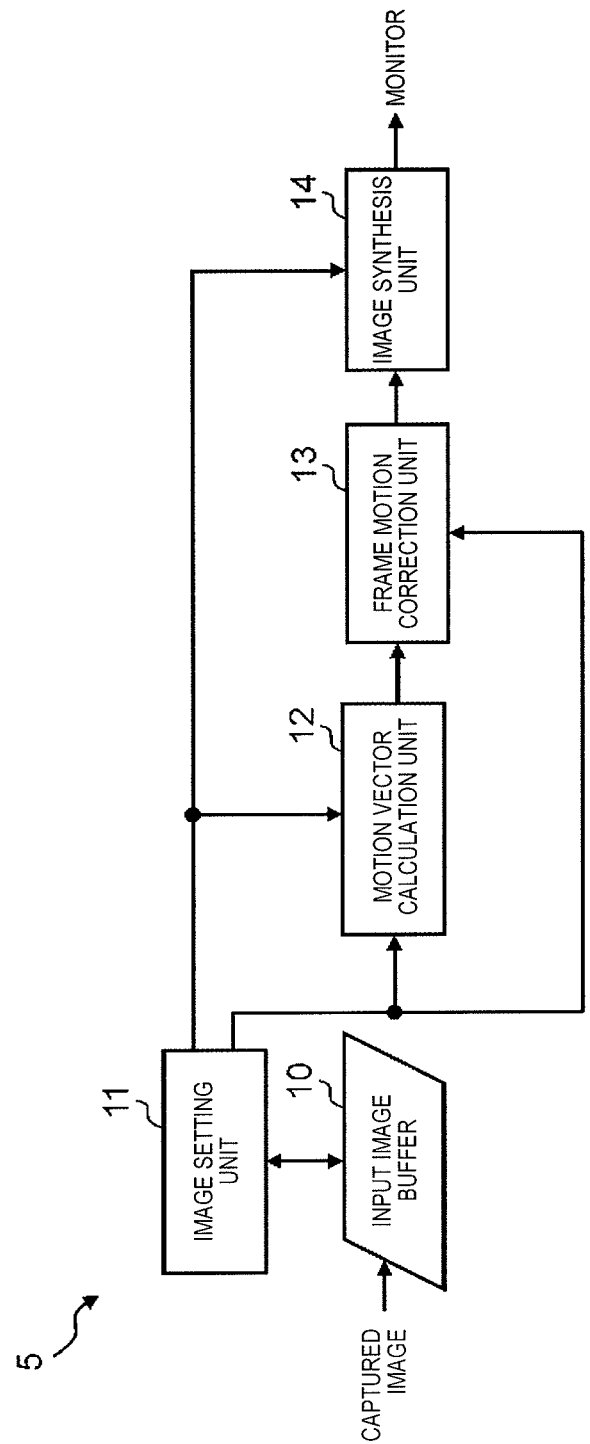
FIG. 3 is a block diagram illustrating a first example of an image processing device according to a first embodiment.

FIG. 3 is a block diagram illustrating a first example of image processing device 5 based on the first exemplary embodiment of the present disclosure. As shown in the drawing, image processing device 5 includes input image buffer 10, image setting unit 11, motion vector calculation unit 12, frame motion correction unit 13, and image synthesis unit 14. The input image buffer 10 stores images captured by vehicle-mounted camera 3 in time series. The image setting unit 11 sets a predetermined processing target image serving as an object to be processed this time, and reads out an image to be processed and a plurality of relevant images adjacent to the processing target image from input image buffer 10. The motion vector calculation unit 12 receives inputs of the plurality of relevant images from input image buffer 10. The frame motion correction unit 13 receives inputs of motion vector calculation values of the plurality of relevant images of which the motion vectors are calculated by motion vector calculation unit 12, and receives inputs of the plurality of relevant images from input image buffer 10. The image synthesis unit 14 receives inputs of correction images having been subjected to motion correction by frame motion correction unit 13 and the processing target images from input image buffer 10, synthesizes the correction images, and outputs the synthetic image to be shown on monitor 4. Input image buffer 10 and motion vector calculation unit 12 are examples of image feature extraction units, and frame motion correction unit 13 and image synthesis unit 14 are examples of disturbance suppression units.

Figure 4:
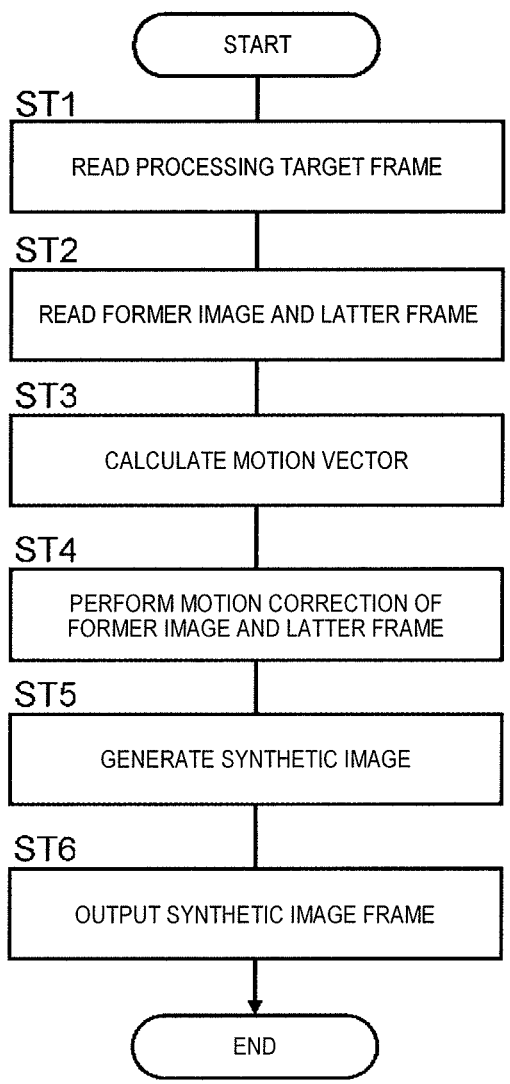
FIG. 4 is a flowchart of a first example of the first embodiment.
Figure 5:
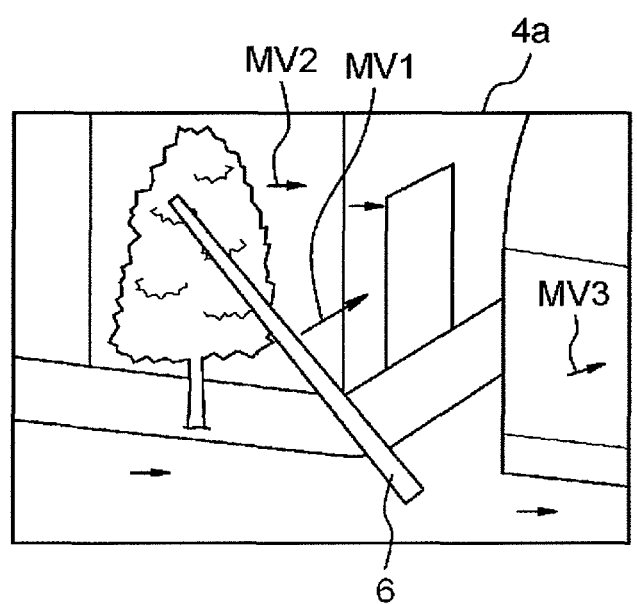
FIG. 5 is a diagram illustrating motion vectors on a screen.

Next, a control knack for image processing device 5 based on a first example of the first exemplary embodiment will be described with reference to a flowchart of FIG. 4 and a diagram illustrating a video on screen 4a of FIG. 5. In input image buffer 10, a plurality of images captured by vehicle-mounted camera 3 are stored directly from vehicle-mounted camera 3 or in time series through personal computer PC. A description will be given on the assumption that an image to be processed this time is referred to as a processing target image, the past image thereof in time series is referred to as a former image, and the future image thereof is referred to as a latter image.

In step ST1, a processing target frame equivalent to a processing target image is read out from input image buffer 10 by image setting unit 11, and is input to motion vector calculation unit 12 and image synthesis unit 14. In step ST2, a former frame equivalent to a former image and a latter frame equivalent to a latter image are read out from input image buffer 10 by image setting unit 11, and is input to motion vector calculation unit 12 and frame motion correction unit 13. The former image and the latter image are a plurality of relevant images adjacent to the processing target image in time-series, but are not limited to the respective former and latter images. The images may be either former images or latter images, and may be a plurality of images. Further, the images are not limited to continuous frames in frame processing, and may be separate images of a plurality of frames which are positioned at the front and back of the processing target image.

In step ST3, motion vector calculation unit 12 calculates a motion vector for each of the images of the former and latter frames on the basis of the processing target image. Motion vectors in block units constituted by pixels or any number of pixels are calculated, for example, as indicated by arrows (MV1, MV2, MV3) partially illustrated in FIG. 5. The calculation of the motion vectors may be performed by a known block matching method, gradient method, or the like. FIG. 5 illustrates a case where automobile 1 turns to the left.

In step ST4, frame motion correction unit 13 generates images (hereinafter, referred to as motion correction images) having been subjected to motion correction on the basis of the motion vectors of the respective frames which are calculated in step ST3, with respect to the former and latter frames read out from input image buffer 10.

In step ST5, image synthesis unit 14 performs image synthesis. Here, a synthetic image is generated by performing median processing between pixels corresponding to each other with respect to a time axis by using the motion correction images generated by frame motion correction unit 13 with respect to the former and latter frames and the processing target frame (processing target image) read out from input image buffer 10. The median processing according to the present disclosure may be processing using a known median filter, and is an example of averaging processing. The averaging processing refers to processing using, such as brightness at a predetermined position (for example, the fourth or fifth brightness) in order, simple average brightness, or high-frequency brightness, which is performed on a plurality of pixels adjacent to an attention pixel, other than the above-described median processing.

In a case where snow is seen in the processing target image and is not seen in the corresponding portion of the relevant image, the synthetic image may be an image in which snow is erased, by median processing of the plurality of motion correction images. In a case of a fixed camera for observing a fixed point, a passing vehicle, person, or the like serves as a moving subject. However, it is possible to suppress the erasure of snow and afterimage tear or partial disappearance in the moving subject in the synthetic image synthesized using a motion correction images having been subjected to motion correction with respect to a moving subject. In vehicle-mounted camera 3 according to this exemplary embodiment, scenery, another vehicle, or the like moving by traveling becomes a moving subject as an object to be captured. Since the synthetic image is generated using the processing target image and the motion correction images having been subjected to motion correction on the basis of the processing target image by the above-described image processing, it is possible to suppress afterimage tear in a moving subject or partial disappearance in a synthetic image. Thereby, even when a moving subject is set to be an object to be captured as in vehicle-mounted camera 3, it is possible to achieve both the removal of disturbance and the suppression of disorder of an image.

Figure 6:
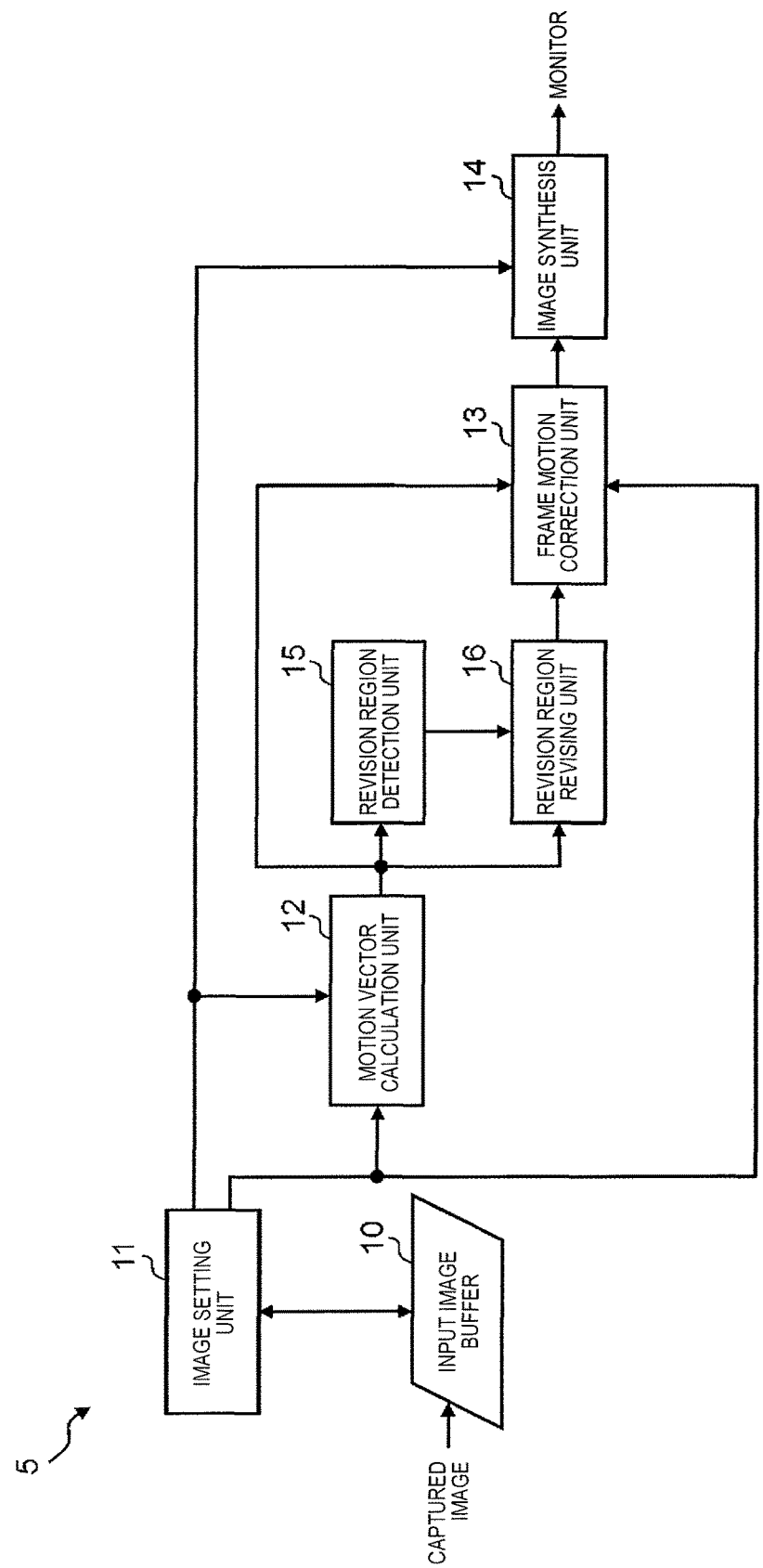
FIG. 6 is a diagram corresponding to FIG. 3 and illustrating a second example of the first embodiment.

Next, a second example of the first exemplary embodiment will be described with reference to FIG. 6 corresponding to FIG. 3. The same components as those in the above-described example are denoted by the same reference numerals and signs, and a detailed description thereof will be omitted. In the second example of the first exemplary embodiment, revision region detection unit 15 and revision region revising unit 16 are provided, as illustrated in the drawing. The revision region detection unit 15 receives inputs of motion vector calculation values of a plurality of images of which the motion vectors are calculated by motion vector calculation unit 12. The revision region revising unit 16 receives an input of revision region information from revision region detection unit 15 and receives inputs of the motion vector calculation values from motion vector calculation unit 12. Revision region revising unit 16 revises a motion vector for a revision region and inputs motion vector revision information for the revision region to frame motion correction unit 13. Frame motion correction unit 13 generates a motion correction image on the basis of the motion vector calculation values received from motion vector calculation unit 12 and the motion vector revision information received from revision region revising unit 16 and outputs the motion correction image to image synthesis unit 14. The image synthesis performed by image synthesis unit 14 is the same as that in the above-described first example of the first exemplary embodiment.

Figure 7:
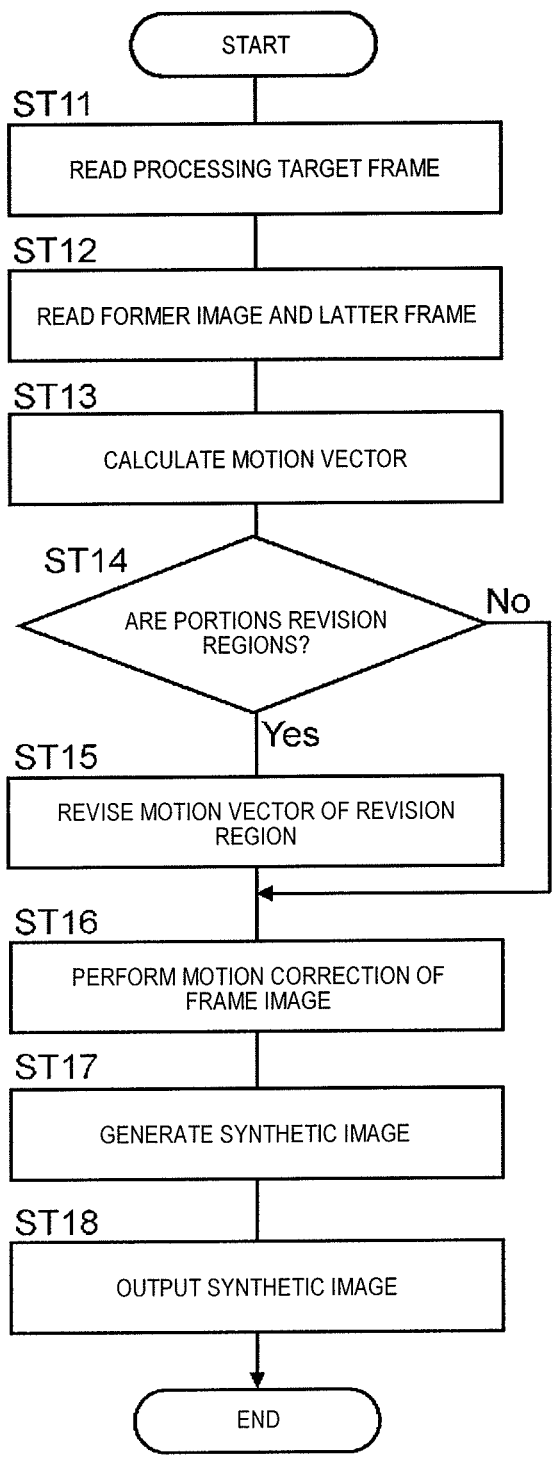
FIG. 7 is a flowchart of the second example of the first embodiment.

A control knack in the second example of the first exemplary embodiment will be described with reference to a flowchart of FIG. 7 corresponding to FIG. 4. Steps ST11 to ST13 are the same as steps ST1 to ST3 in the first example of the first exemplary embodiment.

In step ST14 subsequent to step ST13, it is determined whether or not portions (for example, a plurality of separate blocks) of the frames are revision regions (reference numeral 21 in FIG. 8) on the basis of the motion vectors calculated in step ST3. A determination knack for the revision region 21 will be described with reference to FIG. 8.

Figure 8:
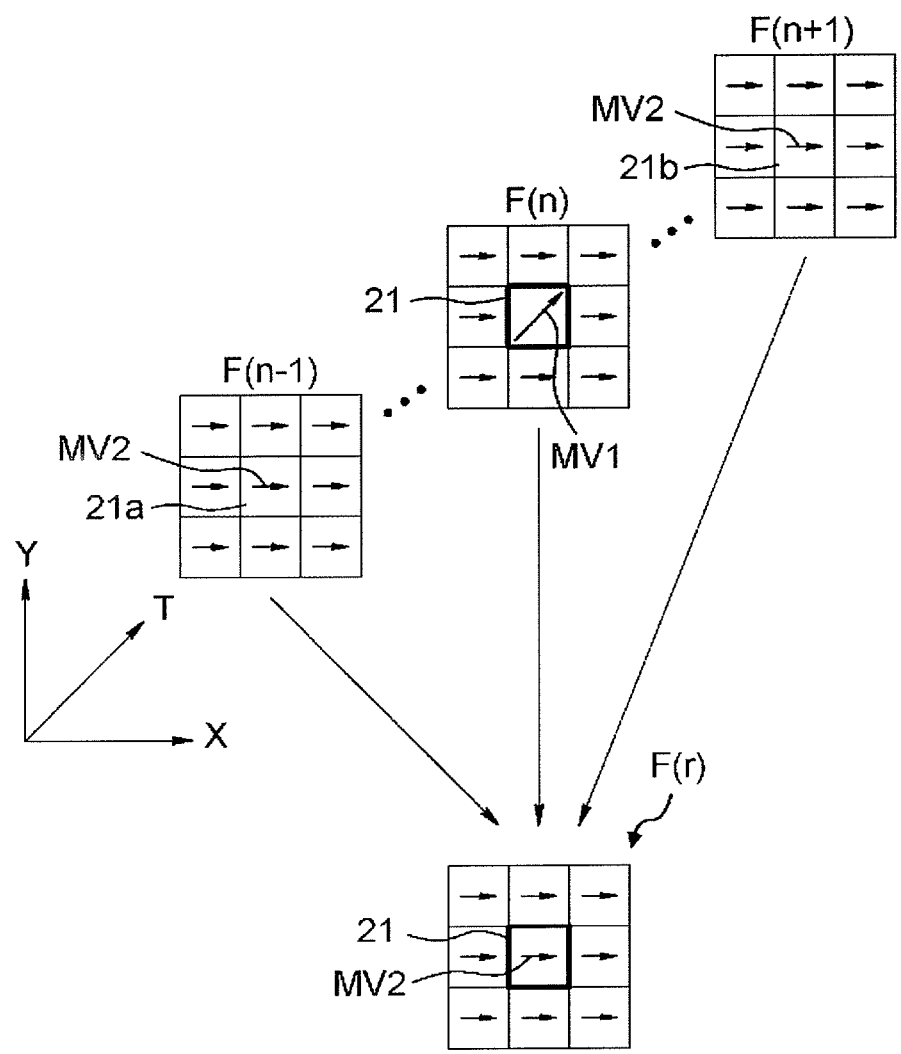
FIG. 8 is a diagram illustrating a correction knack for a revision region.

FIG. 8 illustrates the present frame F(n) serving as an object for which a motion vector is revised, former frame F(n−1) which is prior to present frame F(n) in time series, and latter frame F(n+1) which is after the present frame in time series. These frames may be frames adjacent to each other, or may be a predetermined number of frames.

In the drawing, an X-axis and a Y-axis indicate a space (two-dimension) of screen 4a, and a T-axis indicates a time axis between frames. The drawing illustrates an example using 3×3 blocks of a space axis and 3 frames of a time axis. However, the present disclosure is not limited to the number of blocks and the number of frames for the space axis and the time axis, and a combination of another number of blocks and another number of frames may be used. The blocks are obtained by dividing a frame by a predetermined number of pixels. In a case where wiper blade 6 can be specified as a visual field obstacle as in this exemplary embodiment, processing can be accelerated by setting the size of the block depending on the object.

The drawing illustrates an example in which motion vector MV1 (>=MVr) equal to or greater than a predetermined threshold value (MVr) is calculated in the middle block, and motion vector MV2 (<MVr) less than the threshold value is calculated in the peripheral blocks in present frame F(n). For convenience of description, the drawing illustrates an example in which motion vector MV1 equal to or greater than predetermined threshold value MVr is calculated only in the middle block, and motion vector MV2 (<MVr) less than the threshold value is calculated for 3×3 blocks illustrated in the drawing in former frame F(n−1) and latter frame F(n+1) in present frame F(n). Same motion vector MV2 is shown for each block, but does not mean the same value and means substantially the same value and a value less than threshold value MVr.

In this exemplary embodiment, threshold value MVr is set to be a value which is greater than a motion vector of scenery during normal traveling and is less than a motion of wiper blade 6 at low speed. A moving speed of wiper blade 6 is sufficiently higher than the speed of a flow of scenery through front window 2 during normal traveling so as not to interrupt a driver's visual field, and it is possible to determine the motion of wiper blade 6 and the motion of the scenery by using threshold value MVr described above.

Figure 9:
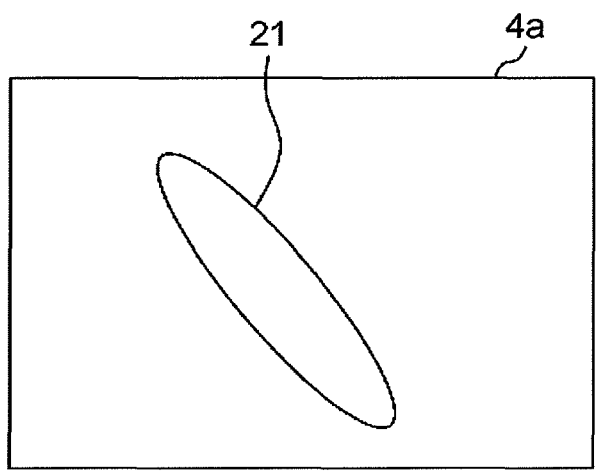
FIG. 9 is a diagram illustrating a revision region.

A portion serving as motion vector MV1 corresponding to the motion of wiper blade 6 is, for example, a range indicated as revision region 21 in FIG. 9.

In step ST14, in a case where the determination result indicates correspondence to revision region 21 by the calculation of the motion vector for the block, the motion vector of each block of revision region 21 is revised by revision region revising unit 16 in step ST15. For example, revision region 21 of present frame F(n) is revised using motion vectors of regions corresponding to former and latter frames F(n−1) and F(n+1). In the example of the blocks of FIG. 8, averaging processing is performed on motion vectors MV2 of corresponding blocks 21a and 21b of former and latter frames F(n−1) and F(n+1) with respect to the blocks (revision regions 21) in which motion vector MV1 is calculated in present frame F(n).

An example of the averaging processing is processing performed on a motion vector, similar to the above-described median processing for a pixel. In a case of the example illustrated in the drawing, a median value is MV2, and motion vector MV2 is set to be a revised revision motion vector of revision region 21. FIG. 8 illustrates one former frame F(n−1) and one latter frame F(n+1). However, a plurality of frames on either the front or back side may be used as targets, and the number of frames serving as targets for median processing may be three or more.

The revision of the motion vector of revision region 21 is not limited to processing performed on regions corresponding to revision regions 21 of a plurality of relevant images arranged in time series. For example, a revision motion vector of revision region 21 may be set to 0, and motion vectors obtained by performing median processing on the peripheral motion vectors of revision region 21 may be set to be revision motion vectors.

After step ST15 or in step ST14, in a case where it is determined that there is no motion vector corresponding to revision region 21, the processing proceeds to step ST16. In step ST16, frame motion correction unit 13 generates motion correction images for former and latter frames F(n−1) and F(n+1) received from input image buffer 10 with reference to the motion vectors (MV2) calculated in step ST13 and the revision motion vectors (MV2) of revision regions 21 revised in step ST15.

In step ST17, image synthesis unit 14 synthesizes the processing target image received from input image buffer 10 and the motion correction images having been subjected to motion correction in step ST16, similar to the first example of the first exemplary embodiment. In the next step ST18, a synthetic image obtained by the synthesis performed in step ST17 is output to monitor 4.

A motion vector of wiper blade 6 greatly affects the peripheral motion vectors of wiper blade 6. On the other hand, former and latter frames F(n−1) and F(n+1) are subjected to motion correction on the basis of the processing target image obtained by revising the motion vector of revision region 21 serving as a passing region of wiper blade 6 by the revision motion vector (MV2), and thus it is possible to perform the motion correction of former and latter frames F(n−1) and F(n+1) without being affected by a great motion vector of wiper blade 6.

In this manner, in a case where wiper blade 6 having a great motion vector is captured as a visual field obstacle, a synthetic image is generated by complementing a portion representing wiper blade 6 in the processing target image by images of corresponding portions of the respective motion correction images having been subjected to motion correction for scenery as a moving subject. The image of the complemented portion is a portion having the same motion vector (motion associated with the traveling of automobile 1) as that of the vicinity of a region (revision region 21) through which wiper blade 6 passes. In a case where there is a slight time difference, such as 30 frames per second, between frames, a portion having the time difference occurred therein is not at least conspicuous. Thereby, the synthetic image corresponding to the processing target image can be set to be an image from which wiper blade 6 has been erased, and inconvenience caused by the movement of wiper blade 6 on screen 4a is canceled at the time of taking notice of a portion of scenery closely, whereby an easily viewable moving image is obtained.

Since the motion of wiper blade 6 covers a wide range of front window 2, a motion vector of wiper blade 6 exerts a great influence in an image captured by vehicle-mounted camera 3. On the other hand, it is possible to generate a synthetic image which is not influenced by the great motion vector of wiper blade 6 by the above-described image processing and to avoid a portion (moving subject due to traveling), which is shown as scenery, disappearing due to afterimage tear of wiper blade 6 or the like in the image from which wiper blade 6 has been erased.

In the above-described second example of the first exemplary embodiment, revision region 21 is obtained by determining the motion of wiper blade 6 by a difference in magnitude between motion vectors. However, for example, in a case of wiper blade 6, the wiper blade is captured as an image of a black object, and thus it is possible to specify wiper blade 6 by a difference in concentration (brightness). In this case, it is possible to determine whether or not a region for which a motion vector equal to or greater than threshold value MVr is calculated in revision region detection unit 15 of FIG. 7 has concentration (brightness) equivalent to wiper blade 6, and to determine that a portion determined to have concentration (brightness) equivalent to that of wiper blade 6 serves as revision region 21. Thereby, it is possible to further reliably perform the determination of revision region 21.

In a case where the motion of wiper blade 6 is determined and, for example, an angle of an extension direction of a pixel considered to be wiper blade 6 by the above-described brightness substantially conform to an angle (inclination of a normal line in an arc), which is input in advance, generated in the motion of wiper blade 6, it is possible to determine that the portion is wiper blade 6. In this manner, the determination of revision region 21 may be performed.

In a case of a fixed camera for observing a fixed point, a passing vehicle, person, or the like serves as a moving subject. In this case, for example, snow passing through the vicinity of the camera during snowfall acts as a visual field obstacle for a vehicle or a person moving at a distance, similar to wiper blade 6. It is possible to similarly perform the revision of a motion vector with respect to snow during snowfall. In a case where snow is seen in the processing target image and is not seen in the corresponding portion of the relevant image, the synthetic image may be an image in which snow is erased, by median processing of the plurality of motion correction images.

The disclosure of the first exemplary embodiment described above can also be applied to second to fourth exemplary embodiments to be described later.

(Second Exemplary Embodiment)

Figure 10:
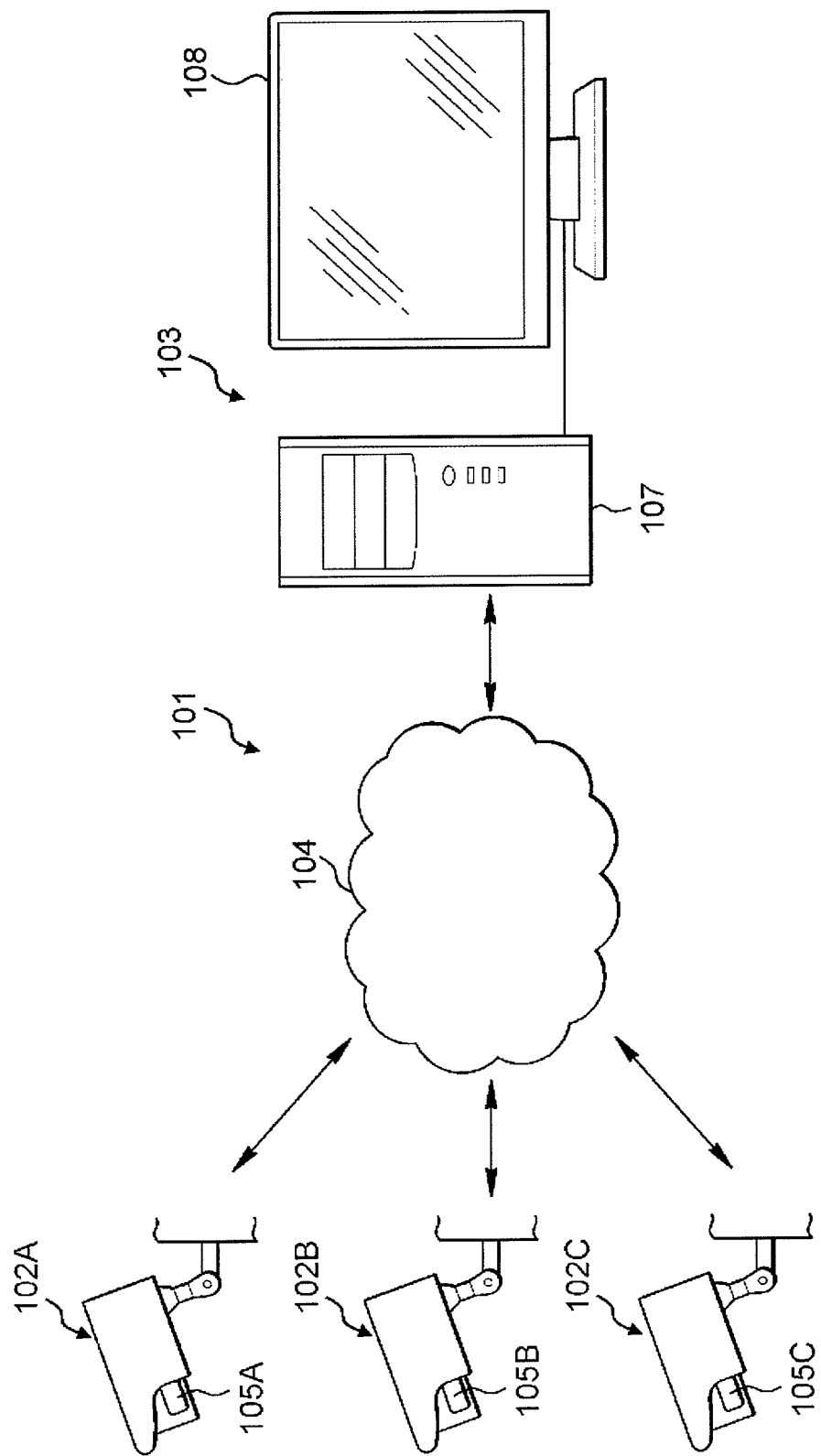
FIG. 10 is a configuration diagram illustrating an outline of a monitoring system according to a second embodiment.

FIG. 10 is a configuration diagram illustrating an outline of monitoring system 101 according to the second exemplary embodiment of the present disclosure. As illustrated in FIG. 10, monitoring system 101 includes plurality of monitoring cameras (image capture device) 102A to 102C that capture an image of an outdoor subject, and image processing device 103 that acquires the captured images captured by monitoring cameras 102A to 102C and perform predetermined image processing thereon. In monitoring system 101, monitoring cameras 102A to 102C (hereinafter, collectively referred to as monitoring camera 102) are communicably connected to image processing device 103 through network 104. Here, network 104 is constituted by a wide-area network such as the Internet based on a public line or a dedicated line, but is not limited thereto. Monitoring camera 102 and image processing device 103 may be configured to communicate with each other by a local area network (LAN), a dedicated cable, or the like.

Monitoring camera 102 has a known configuration, and forms a video through a lens not shown in the drawing on an image sensor to thereby output the video as a video signal converted into an electrical signal. Monitoring cameras 102A to 102C are respectively provided with microphones (sound input devices) 105A to 105C (hereinafter, collectively referred to as microphone 105), and can acquire a peripheral sound (here, particularly, a sound related to a weather condition, such as rainfall, a hailstorm, or a thunderclap, during image capture). Monitoring cameras 102A to 102C are respectively installed in a plurality of outdoor monitoring areas. FIG. 10 illustrates an example in which three monitoring cameras 102A to 102C are provided, but is not limited thereto. The number and arrangement of monitoring cameras 102 and microphones 105 can be modified in various ways.

Image processing device 103 is constituted by a personal computer (PC) having a function of removing noise generated in a captured image of monitoring camera 102 by image processing on the basis of a weather condition during image capture. Although details are not shown in the drawing, image processing device 103 includes main body 107 and display unit 108 as a monitoring monitor. The main body is provided with a central processing unit (CPU) that integrally executes various image processing, the control of a peripheral device, and the like on the basis of a predetermined control program (image processing program), a random access memory (RAM) that functions as a work area of the CPU, a read only memory (ROM) that stores a control program executed by the CPU and data, a network interface that executes communication processing through a network, an input device, a hard disk drive (HDD), and the like. The display unit displays various information such as images processed in main body 107. Image processing device 103 is not limited to a PC, and may be constituted by dedicated hardware.

Figure 11:
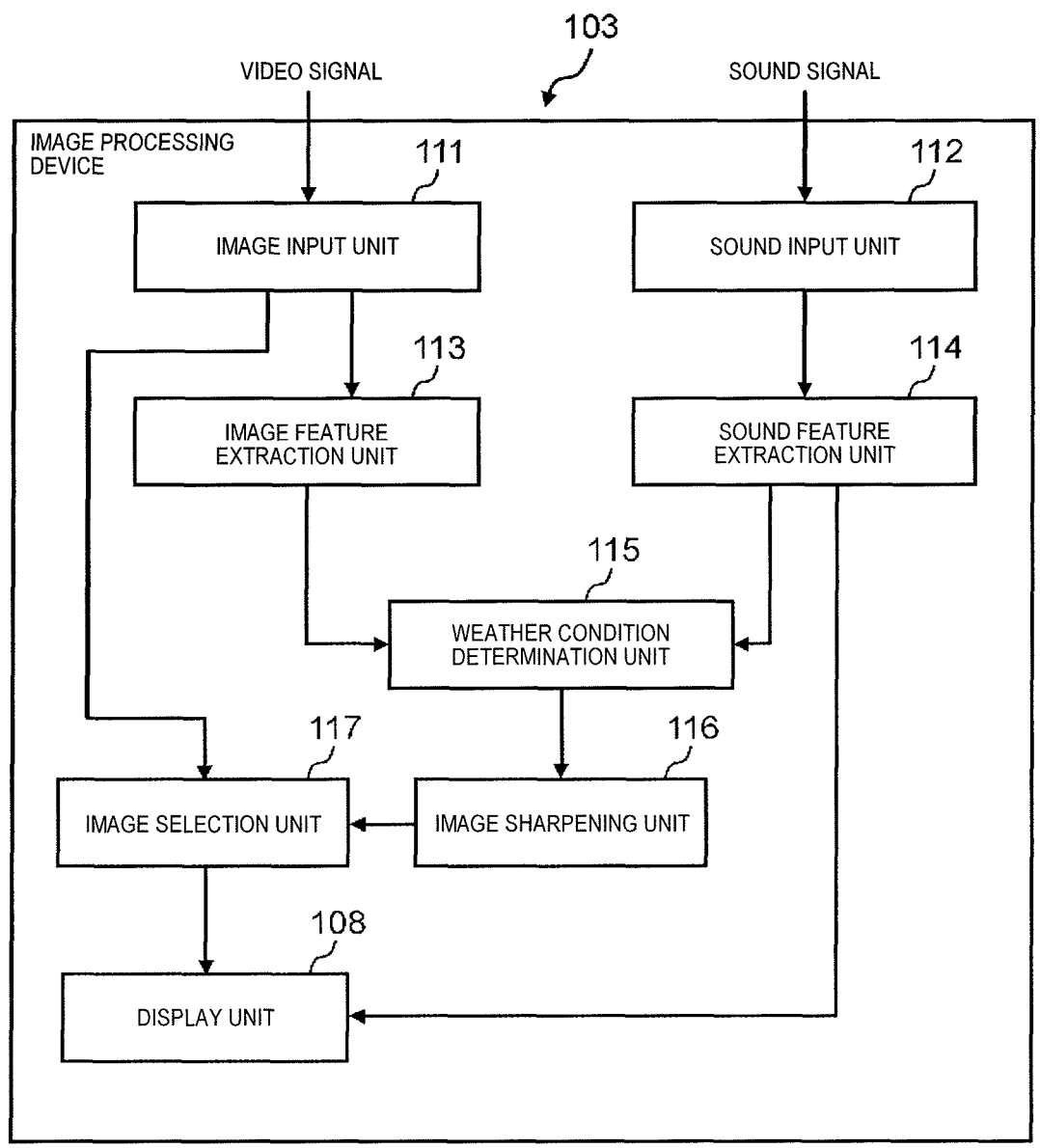
FIG. 11 is a functional block diagram of an image processing device in FIG. 10.

FIG. 11 is a functional block diagram of an image processing device in FIG. 10, and FIG. 12 is a diagram illustrating an example of a weather condition determination table which is used by a weather determination unit in FIG. 11.

As illustrated in FIG. 11, in image processing device 103, a video signal from monitoring camera 102 is input to image input unit 111 through network 104 in real time and is stored. On the other hand, a sound signal from microphone 105 is input to sound input unit 112 through network 104 in real time and is stored.

Image processing device 103 includes image feature extraction unit 113, sound feature extraction unit 114, weather condition determination unit 115, image sharpening unit 116, and image selection unit 117. The image feature extraction unit 113 extracts image features related to a weather condition in a plurality of temporally continuous captured images (data of frame images) based on an input video signal. The sound feature extraction unit 114 extracts sound features related to a weather condition in a peripheral sound (sound data) during image capture based on an input sound signal. The weather condition determination unit 115 determines a weather condition during the capture of an image. The image sharpening unit 116 performs image processing based on the weather condition determined by weather condition determination unit 115 to thereby remove noise caused by a weather condition during image capture from a captured image. The image selection unit 117 selects an image (monitoring image) for a monitoring operator which is displayed on display unit 108. Image sharpening unit 116 is included in a disturbance suppression unit. Alternatively, image sharpening unit 116 may be a disturbance suppression unit itself.

Image feature extraction unit 113 acquires pixel values of R, G, and B channels from a plurality of temporally continuous frame images (here, images at a frame rate of 60 fps based on an RGB format) which are input to image input unit 111 by using an attention pixel as a target, and calculates brightness (Y value) from the R value, the G value, and the B value.

Image feature extraction unit 113 extracts (detects) instantaneous changes in brightness (changes in pixel values for a relatively short time) in corresponding pixels (pixels at corresponding positions) between a captured image to be processed and another captured image temporally adjacent thereto, as image features related to a predetermined weather condition (here, snowfall, rainfall, or a hailstorm). In addition, image feature extraction unit 113 extracts the generation of screen flash in a captured image to be processed (that is, a state where the number of pixels with brightness equal to or greater than a specified value accounts for proportion equal to or greater than a specified value in the entire captured image), as image features related to a predetermined weather condition (here, thunder (wildfire)).

Sound feature extraction unit 114 acquires the intensity (sound pressure level) and a frequency of a peripheral sound which are input to sound input unit 112 at a predetermined cycle (for example, a cycle corresponding to time when a plurality of captured images are captured), and extracts (detects) the intensity and the frequency of the sound as sound features related to a predetermined weather condition (here, rainfall, a hailstorm, or thunder (thunderclap)).

Weather condition determination unit 115 acquires the image features (information regarding the instantaneous changes in brightness and the generation of screen flash) and the sound features (information regarding the intensity and the frequency of the peripheral sound) from image feature extraction unit 113 and sound feature extraction unit 114, and temporarily determines a weather condition on the basis of the image features and the sound features.

More specifically, weather condition determination unit 115 temporarily determines that there is a possibility of a weather condition during image capture indicating any of snowfall, rainfall, and a hailstorm, on the basis of the information regarding the instantaneous changes in brightness of the pixels which are acquired as image features from image feature extraction unit 113. That is, in a case where the weather condition indicates snowfall, rainfall, or a hailstorm, a large number of small regions (points, lines, or the like), such as snow particles, raindrops, or hailstones, which have white color or color similar thereto are generated in a captured image (that is, instantaneous changes in brightness occur in a plurality of pixels separated from each other. Accordingly, weather condition determination unit 115 can temporarily determine that there is a possibility of the weather condition indicating any of snowfall, rainfall, and a hailstorm.

In this exemplary embodiment, weather condition determination unit 115 does not distinguish between snowfall, rainfall, and a hailstorm based on a captured image (changes in pixel values), but is not limited thereto. The weather condition determination unit may determine snowfall, rainfall, and a hailstorm on the basis of the pixel value (the R value, the G value, the B value, and the Y value) and regions (arrangement of pixels) in which the pixel values change in the captured image.

Weather condition determination unit 115 temporarily determines that there is a possibility of a weather condition during image capture indicating thunder (wildfire), on the basis of the information regarding the generation of screen flash which is acquired as the image features from image feature extraction unit 113. That is, in a case where the weather condition indicates thunder (wildfire), there are changes (an increase in brightness) in the pixel values due to wildfire in the pixels in the entire captured image (or in a wide region equal to or greater than fixed proportion which is set in advance). Accordingly, weather condition determination unit 115 can temporarily determine that the weather condition indicates thunder (wildfire).

Weather condition determination unit 115 temporarily determines that there is a possibility of the weather condition during image capture indicating any of rainfall, a hailstorm, and thunder (thunderclap), on the basis of the information regarding the intensity and the frequency of the peripheral sound (here, a sound pressure level in a predetermined band) which is acquired as the sound features from sound feature extraction unit 114. That is, in a case where the weather condition indicates any of rainfall, a hailstorm, and thunder (thunderclap), a sound having a peculiar intensity and frequency is generated due to raindrops falling on the ground or a house, hailstones or a thunderclap. Thereby, weather condition determination unit 115 can temporarily determine that the weather condition indicates any of rainfall, a hailstorm, and thunder (thunderclap). In this case, in monitoring system 101, reference values of the intensity and the frequency of a sound related to each of rainfall, a hailstorm, and thunder (thunderclap) (reference ranges for determining the weather condition on the basis of the sound features) are set in advance, and thus weather condition determination unit 115 temporarily determines that a weather condition corresponding to the reference values is the weather condition during image capture in a case where the intensity and the frequency of the peripheral sound conform to the reference values of any of rainfall, a hailstorm, and thunder (thunderclap).

Weather condition determination unit 115 can also estimate magnitudes of rainfall and a hailstorm and the generation position of thunder (a distance from the location (microphone 105) where image capture is performed) on the basis of the intensity of the peripheral sound. Weather condition determination unit 115 can also temporarily determine that the weather condition during image capture indicates any of rainfall, a hailstorm, and thunder (thunderclap), on the basis of temporal changes in at least one of the intensity and the frequency of the peripheral sound. Weather condition determination unit 115 does not perform temporary determination for snowfall with no sound features (a sound is hardly generated).

Weather condition determination unit 115 determines (main determination) a weather condition with reference to a weather condition determination table illustrated in FIG. 12, on the basis of results of temporary determination based on the above-described image features and sound features.

More specifically, regarding the image features, in a case where weather condition determination unit 115 temporarily determines that there is a possibility of a weather condition during image capture indicating any of snowfall, rainfall, and a hailstorm, the result of a determination item "instantaneous pixel brightness change" in a column of an image processing result on the left side in FIG. 12 indicates "detected". On the other hand, in a case where weather condition determination unit 115 does not temporarily determine that there is a possibility of the weather condition indicating any of snowfall, rainfall, and a hailstorm (that is, there are no instantaneous changes in predetermined brightness in pixels), the result of the determination item "instantaneous pixel brightness change" indicates "undetected". In addition, in a case where weather condition determination unit 115 temporarily determines that there is a possibility of the weather condition indicating thunder (wildfire) during image capture, the result of a determination item "generation of screen flash" in the column of the image processing result indicates "detected". On the other hand, in a case where weather condition determination unit 115 does not temporarily determines that there is a possibility of the weather condition indicating thunder (wildfire) during image capture (that is, screen flash is not generated), the result of the determination item "generation of screen flash" indicates "undetected".

Regarding the sound features, in a case where weather condition determination unit 115 temporarily determines that there is a possibility of the weather condition indicating rainfall, the result of a determination item "rainfall feature sound" in a column of a sound processing result in the middle in FIG. 12 indicates "detected". On the other hand, in a case where weather condition determination unit 115 does not temporarily determine that there is a possibility of rainfall, the result of the determination item "rainfall feature sound" indicates "undetected". In a case where weather condition determination unit 115 temporarily determines that there is a possibility of the weather condition indicating a hailstorm, the result of a determination item "hailstorm feature sound" in the column of the sound processing result indicates "detected". On the other hand, in a case where weather condition determination unit 115 does not temporarily determine that there is a possibility of a hailstorm, the result of the determination item "hailstorm feature sound" indicates "undetected". Further, in a case where weather condition determination unit 115 temporarily determines that there is a possibility of the weather condition indicating thunder (thunderclap), the result of a determination item "thunderclap feature sound" in the column of the sound processing result indicates "detected". On the other hand, in a case where weather condition determination unit 115 does not temporarily determine that there is a possibility of thunder (thunderclap), the result of the determination item "thunderclap feature sound" indicates "undetected".

In a case where the result of the determination item "instantaneous pixel brightness change" or "generation of screen flash" related to the above-described image processing result indicates "undetected" and the result of the determination item "rainfall feature sound", "hailstorm feature sound", or "thunderclap feature sound" related to the sound processing result indicates "undetected", weather condition determination unit 115 determines that all of snowfall, rainfall, a hailstorm, and thunder (wildfire) indicate undetected (weather condition, such as clear weather or cloudiness, in which noise of a captured image is hardly generated), with reference to the column of "weather condition determination result" on the right side of FIG. 12.

In a case where the result of the determination item "rainfall feature sound" related to the sound processing result indicates "detected", weather condition determination unit 115 determines that the weather condition indicates rainfall with reference to the column of "weather condition determination result", regardless of the result of the determination item "instantaneous pixel brightness change" related to the image processing result. Thereby, in monitoring system 101, in a case where a sound feature of rainfall which is relatively easy to discriminate from other weather conditions is extracted, it is possible to acquire an image from which noise has been appropriately removed by image processing based on rainfall, without being affected by an image feature of rainfall which is relatively difficult to discriminate from other weather conditions.

In a case where the result of the determination item "instantaneous pixel brightness change" indicates "detected" and the results of the determination items "rainfall feature sound" and "hailstorm feature sound" related to the sound processing result indicate "undetected", weather condition determination unit 115 determines that the weather condition indicates snowfall with reference to the column of the "weather condition determination result".

In a case where the result of the determination item "hailstorm feature sound" related to the sound processing result indicates "detected", weather condition determination unit 115 determines that the weather condition indicates a hailstorm with reference to the column of the "weather condition determination result", regardless of the results of the determination item "instantaneous pixel brightness change" related to the image processing result. Thereby, in monitoring system 101, in a case where a sound feature of a hailstorm which is relatively easy to discriminate from other weather conditions is extracted, it is possible to acquire an image from which noise has been appropriately removed by image processing based on the hailstorm, without being affected by an image feature of the hailstorm which is relatively difficult to discriminate from other weather conditions.

In a case where the result of the determination item "thunderclap feature sound" related to the sound processing result indicates "detected", weather condition determination unit 115 can determine that the weather condition indicates thunder with reference to the column of the "weather condition determination result", regardless of the result of the determination item "generation of screen flash" related to the image processing result. However, even when the result of the determination item "thunderclap feature sound" related to the sound processing result indicates "detected", there is a possibility that wildfire does not occur (only a thunderclap not being noise of a captured image is generated). Thus, weather condition determination unit 115 may determine that the weather condition indicates thunder only in a case where the result of the determination item "generation of screen flash" related to the image processing result indicates "detected" and the result of the determination item "thunderclap feature sound" related to the sound processing result indicates "detected".

In a case where the result of the determination item "generation of screen flash" related to the image processing result indicates "detected", weather condition determination unit 115 can determine that the weather condition indicates thunder with reference to the column of the "weather condition determination result", regardless of the result of the determination item "thunderclap feature sound" related to the sound processing result.

Referring back to FIG. 11, image sharpening unit 116 removes noise in a captured image by median filtering in a time-axis direction. More specifically, image sharpening unit 116 performs a process of sorting pixel values between corresponding pixels with respect to a time axis on a plurality of temporally continuous captured images (frame images) including a captured image to be processed, thereby acquiring the median value thereof. In this case, the plurality of temporally continuous captured images are captured images that are temporally located before and after the captured image to be processed (temporally former captured images or temporally latter captured images on the basis of the captured image to be processed, or both of them). Image sharpening unit 116 generates a captured image (hereinafter, referred to as a "noise removal image") from which noise caused by a weather condition has been removed, on the basis of the median value of the pixels. Image sharpening unit 116 can perform another known image processing (for example, grayscale correction) which contributes to the sharpening of an image, together with median filtering.

Image sharpening unit 116 performs a plurality of different image sharpening processes (image processing for removing noise) in accordance with a specific weather condition (here, snowfall, rainfall, a hailstorm, and thunder) which is determined by weather condition determination unit 115. More specifically, image sharpening unit 116 can change the number of temporally continuous captured images to be subjected to sorting processing in accordance with the weather condition in the median filtering. For example, image sharpening unit 116 can set the number of captured images to be subjected to sorting processing in a case of rainfall to be a smaller number m (<n) than the number of temporally continuous captured images n to be subjected to sorting processing in the median filtering in a case of snowfall.

Image sharpening unit 116 does not perform image sharpening processing in a case where a specific weather condition (here, any of snowfall, rainfall, a hailstorm, and thunder) is not determined by weather condition determination unit 115. The present disclosure is not limited to the median filtering, and image sharpening unit 116 can remove noise in a captured image by another known image processing. Also in this case, image sharpening unit 116 is configured to be capable of selectively performing a known noise removal method suitable for the removal of noise caused by snowfall, rainfall, a hailstorm, and wildfire from among a plurality of known methods, in accordance with a weather condition.

The captured image before noise removal (hereinafter, referred to as "input image") from image input unit 111 and the noise removal image from image sharpening unit 116 are input to image selection unit 117. An operator of image processing device 103 can select a monitoring mode in which the noise removal image (monitoring image) is output to display unit 108 and a normal mode (weather confirmation mode) in which an input image (weather confirmation image) is output to display unit 108, as an operation mode of image selection unit 117. Thereby, the operator can satisfactorily confirm a subject to be noticed by displaying the noise removal image on display unit 108 in a case where monitoring is required, while can visually confirm the outside (location where image capture is performed) weather by displaying the input image on display unit 108 in a case where monitoring is not required. The operator changes over the operation mode of image selection unit 117 in real time, and thus there is also an advantage in that it is possible to increase the accuracy of monitoring by confirming both the input image and the noise removal image even in a weather condition in which it is difficult to remove noise by image processing.

Image processing device 103 may be configured such that image selection unit 117 is omitted and both the input image and the noise removal image are output from display unit 108. In this case, in display unit 108, both the input image and the noise removal image can be simultaneously displayed through display on two screens.

Figure 13:
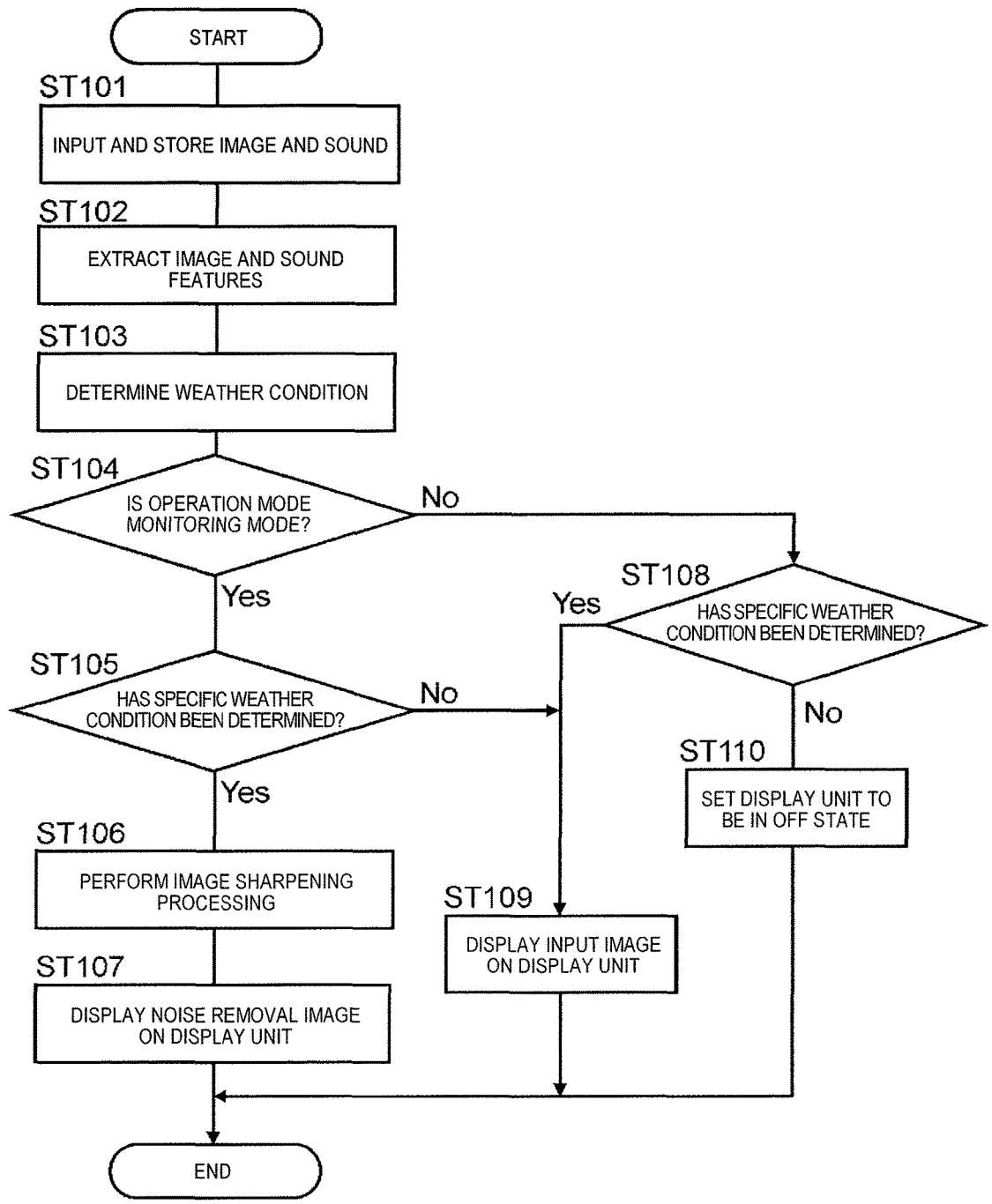
FIG. 13 is a flow chart illustrating a flow of processing performed by a monitoring system according to the second embodiment.

FIG. 13 is a flow chart illustrating a flow of processing performed by monitoring system 101. In monitoring system 101, a captured image and a peripheral sound which are respectively acquired by monitoring camera 102 and microphone 105 are appropriately input to image input unit 111 and sound input unit 112, respectively, and are stored (ST101). Consequently, image feature extraction unit 113 extracts an image feature from the stored captured image, and sound feature extraction unit 114 extracts a sound feature from the stored peripheral sound (ST102). Subsequently, weather condition determination unit 115 determines a weather condition during the capture of an image, on the basis of the extracted image feature and sound feature (ST103).

Next, in image processing device 103, in a case where a monitoring mode is selected as the operation mode of image selection unit 117 (ST104: Yes), image sharpening unit 116 determines whether or not a specific weather condition (here, any of snowfall, rainfall, a hailstorm, and thunder) has been determined in step ST103 (ST105). Consequently, in a case where the specific weather condition has been determined (ST105: Yes), image sharpening unit 116 performs image sharpening processing (ST106). Subsequently, image selection unit 117 displays a noise removal image (a moving image or a still image) which is obtained by the image sharpening processing on display unit 108 (ST107). Thereby, the operator of image processing device 103 can easily monitor a subject. In step ST105, in a case where the specific weather condition has not been determined (No), an input image is displayed on display unit 108 (ST109). Image processing device 103 is provided with a speaker. In step ST107, it is possible to display the noise removal image and to output a peripheral sound (for example, a rain sound) corresponding to the noise removal image from the speaker.

On the other hand, in step ST104, in a case where the monitoring mode has not been selected (the normal mode has been selected) (ST104: No), image sharpening unit 116 determines whether or not a specific weather condition (here, any of snowfall, rainfall, a hailstorm, and thunder) has been determined (ST108). Consequently, in a case where the specific weather condition has been determined (ST108: Yes), image selection unit 117 displays an input image (a moving image or a still image) from which noise has not been removed on display unit 108 (ST109). Thereby, the operator of image processing device 103 can easily confirm the weather. In ST109, a captured image (an image from which noise has been removed in a weather condition (for example, fair weather) other than the specific weather condition) which has been subjected to image processing in image sharpening unit 116 may be displayed instead of the input image.

In step ST108, in a case where the specific weather condition has not been determined (No), image selection unit 117 sets display unit 108 to be in an OFF state or maintains the OFF state (ST110). Thereby, the operator can recognize that the specific weather condition has occurred only in a case where display unit 108 is set to be in an ON state in the normal mode (recognize, for example, changes in the weather such as starting to rain after fair weather). In step ST110, it is also possible to display an image (for example, a commercial video, a television program video, or the like) which is prepared in advance, instead of setting display unit 108 to be in an OFF state (or maintaining the OFF state). In monitoring system 101, it is possible to repeatedly perform steps ST101 to ST110 described above.

In this manner, according to monitoring system 101, it is possible to determine a weather condition by a simple configuration on the basis of a captured image and a peripheral sound during image capture when image capture is performed outdoors, and to acquire an image from which noise has been appropriately removed by image processing based on the determined weather condition.

The disclosure of the second exemplary embodiment described above can also be applied to the first exemplary embodiment described above and the fourth exemplary embodiment to be described later. Particularly, in a case where the determination of a weather condition in the second exemplary embodiment is performed using the vehicle-mounted camera disclosed in the first exemplary embodiment, a wiper may not be operated during rainfall and snowfall. In this case, it is possible to acquire an image from which noise has been more appropriately removed by removing a wiper in the first exemplary embodiment, in addition to removing noise during rainfall or snowfall in the second exemplary embodiment.

In order to more reliably perform the determination of a weather condition in the second exemplary embodiment, an operation condition of a wiper in the first exemplary embodiment may be added as a disturbance detection condition which is one of the determination conditions of a weather condition. A wiper being operated often means a state of rainfall or snowfall under a severe weather condition, and noise removal during rainfall or snowfall is often required. In contrast, in a case where a wiper is not operated even in a state of rainfall or snowfall, rainfall or snowfall is not that severe in many cases. Accordingly, noise removal during rainfall or snowfall may not be performed.

That is, in image processing device 103, in a case where the monitoring mode has been selected as the operation mode of image selection unit 117 (ST104: Yes), image sharpening unit 116 determines whether or not a specific disturbance condition (here, an operating wiper in addition to any of snowfall, rainfall, hailstorm, and thunder) has been detected in step ST103 (ST105). Consequently, in a case where the specific disturbance has been detected (ST105: Yes), image sharpening unit 116 performs image sharpening processing (ST106). Subsequently, image selection unit 117 displays a noise removal image (a moving image or a still image) which is obtained by the image sharpening processing, that is, an image from which the wiper has been removed, on display unit 108 (ST107). Thereby, the operator of image processing device 103 can easily monitor a subject. In step ST105, in a case where the specific disturbance has not been detected (No), an input image is displayed on display unit 108 (ST109). Image processing device 103 is provided with a speaker. In step ST107, it is possible to display the noise removal image, that is, the image from which the wiper has been removed, and to output a peripheral sound (for example, a rain sound or a sound of the wiper striking a window of a car) which corresponds to the noise removal image from the speaker.

On the other hand, in step ST104, in a case where the monitoring mode has not been selected (the normal mode has been selected) (ST104: No), image sharpening unit 116 determines whether or not the specific disturbance (here, the operation of the wiper in addition to any of snowfall, rainfall, hailstorm, and thunder) has been detected (ST108). Consequently, in a case where the specific disturbance has been detected (ST108: Yes), image selection unit 117 displays an input image (a moving image or a still image) from which noise has not been removed, that is, an image from which the wiper has not been removed on display unit 108 (ST109). Thereby, the operator of image processing device 103 can easily confirm the weather.

Further, in a case where the determination of a weather condition in the second exemplary embodiment is performed, image blur may also be generated due to a storm or strong wind in a case of strong wind and rain, a rainstorm, strong wind and snow, or a snowstorm. In this case, it is possible to more appropriately acquire an image from which noise has been removed by performing image blur correction in the fourth exemplary embodiment, in addition to removing noise during rainfall or snowfall in the second exemplary embodiment.

That is, in image processing device 103, in a case where the monitoring mode has been selected as the operation mode of image selection unit 117 (ST104: Yes), image sharpening unit 116 determines whether or not the specific disturbance (here, a storm or strong wind in addition to any of snowfall, rainfall, a hailstorm, and thunder) has been detected in step ST103 (ST105). Consequently, in a case where the specific disturbance has been detected (ST105: Yes), image sharpening unit 116 performs image sharpening processing (ST106). Subsequently, image selection unit 117 displays a noise removal image (a moving image or a still image) which is obtained by the image sharpening processing, that is, an image having been subjected to image blur correction on display unit 108 (ST107). Thereby, the operator of image processing device 103 can easily monitor a subject. In step ST105, in a case where the specific disturbance has not been detected (No), an input image is displayed on display unit 108 (ST109). Image processing device 103 is provided with a speaker. In step ST107, it is possible to display the noise removal image, that is, the image having been subjected to image blur correction, and to output a peripheral sound (for example, a rain sound) which corresponds to the noise removal image from the speaker.

On the other hand, in step ST104, in a case where the monitoring mode has not been selected (the normal mode has been selected) (ST104: No), image sharpening unit 116 determines whether or not specific disturbance (here, a storm or strong wind in addition to any of snowfall, rainfall, a hailstorm, and thunder) has been detected (ST108). Consequently, in a case where the specific disturbance has been detected (ST108: Yes), image selection unit 117 displays an input image (a moving image or a still image) from which noise has not been removed, that is, an image has not been subjected to image blur correction on display unit 108 (ST109). Thereby, the operator of image processing device 103 can easily confirm the weather. In ST109, a captured image (an image from which noise has been removed in a weather condition (for example, fair weather) other than the specific weather condition) which has been subjected to image processing in image sharpening unit 116 may be displayed instead of the input image.

Further, the above-described wiper removal and image blur correction are appropriately performed in addition to noise removal according to the determination of a weather condition in the monitoring mode, and all of the noise removal according to the determination of a weather condition, the wiper removal, and the image blur correction may not be performed in the normal mode.

(Third Exemplary Embodiment)

Figure 14:
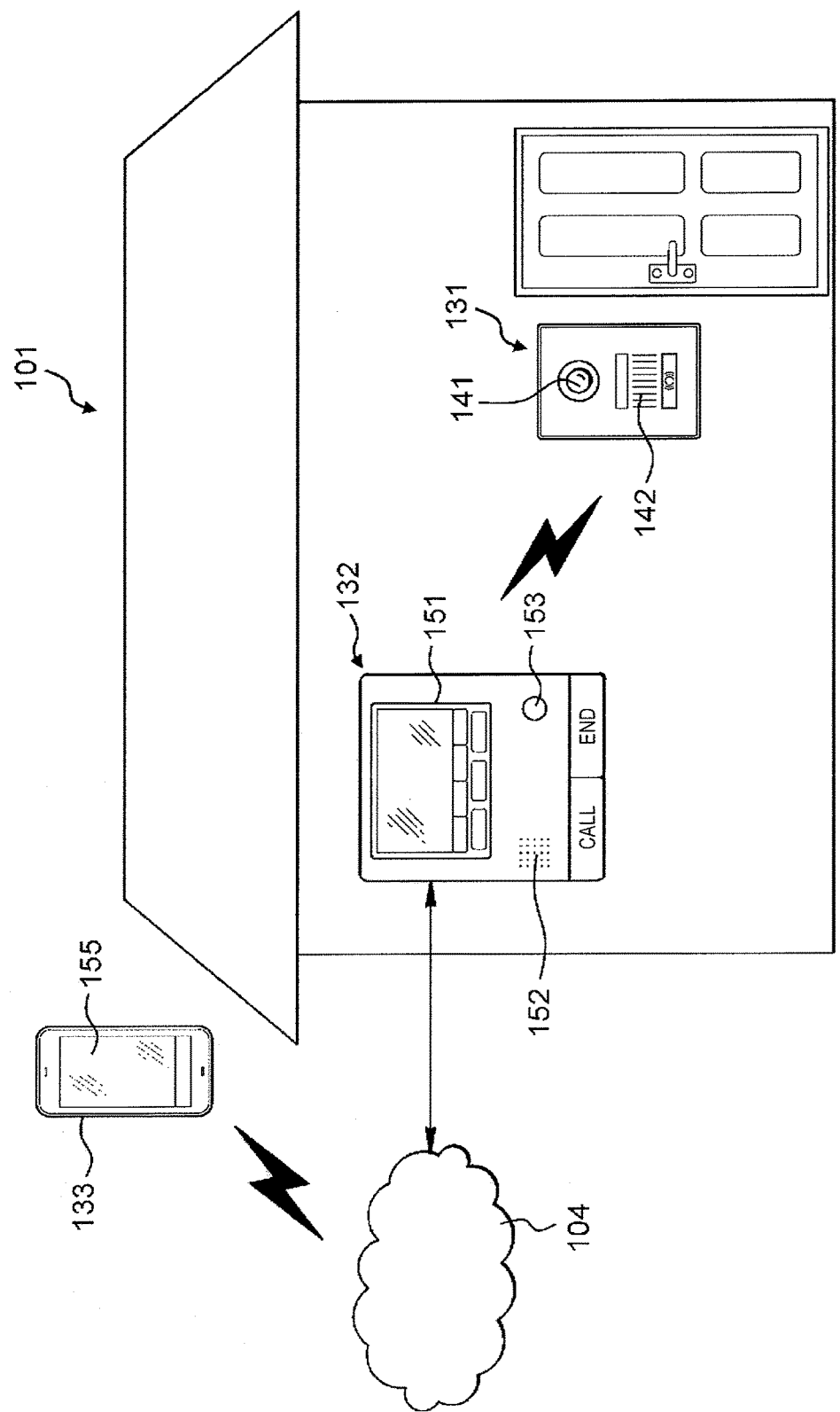
FIG. 14 is a configuration diagram illustrating an outline of a monitoring system according to a third embodiment.

FIG. 14 is a configuration diagram illustrating an outline of monitoring system 101 according to the third exemplary embodiment of the present disclosure. Matters regarding monitoring system 101 according to the third exemplary embodiment which are not particularly mentioned below are the same as those in the case of the second exemplary embodiment, and a detailed description thereof will be omitted. In FIG. 14, the same reference numerals and signs as those according to the second exemplary embodiment described above are denoted by the same reference numerals and signs (the same is true of FIG. 15 to be described later).

As illustrated in FIG. 14, monitoring system 101 according to the third exemplary embodiment includes interphone slave device (image capture device) 131 which is installed outdoors (in the vicinity of the front door of a house) and interphone master device 132 which is installed inside the house. In monitoring system 101, interphone slave device 131 and interphone master device 132 are communicably connected to each other (herein, known wireless communication), and interphone master device 132 is communicably connected to portable terminal 133 through network 104.

Interphone slave device 131 includes camera (image capture device) 141 that captures an image of an outdoor subject, and microphone (sound input device) 142 that acquires a peripheral sound (here, a sound particularly related to a weather condition such as rainfall, a hailstorm, or a thunderclap) during image capture. Interphone master device 132 includes master device monitor (display unit) 151 that displays the captured image captured by camera 141, speaker 152 that outputs the peripheral sound acquired by microphone 142, and display selection button 153 for causing a user to perform an operation of selecting an output destination of information (for example, the captured image captured by camera 141, the peripheral sound acquired by microphone 142, a message regarding a weather condition, and the like) regarding the weather condition. Here, regarding interphone slave device 131 and interphone master device 132, components highly related to the third exemplary embodiment will be mainly described. However, the devices can be provided with other components for performing known interphone functions.

In interphone master device 132, a user of monitoring system 101 can select any of a go-out mode and a normal mode (non-go-out mode) as the operation mode of interphone master device 132 by operating display selection button 153. In a case where the normal mode is selected, the output destination of the information regarding the weather condition is set to be interphone master device 132 (master device monitor 151). On the other hand, in a case where the go-out mode is selected, the output destination of the information regarding the weather condition is set to be portable terminal 133 (portable terminal monitor 155). However, monitoring system 101 can also be configured to further have an operation mode in which an output destination of information regarding a weather condition captured by camera 141 is set to be both interphone master device 132 and portable terminal 133.

Portable terminal 133 is a portable information device carried by a user (a resident or the like) of interphone master device 132. Here, portable terminal 133 is constituted by a mobile phone (smartphone) including portable terminal monitor 155 constituted by a touch panel, and has a known network communication function enabling communication with at least interphone master device 132. However, portable terminal 133 is not limited to the mobile phone, and another information device such as a tablet or a notebook computer having the same function can also be used. A dedicated application program allowing an image and a sound to be transmitted and received to and from interphone master device 132 is installed in portable terminal 133.

Figure 15:
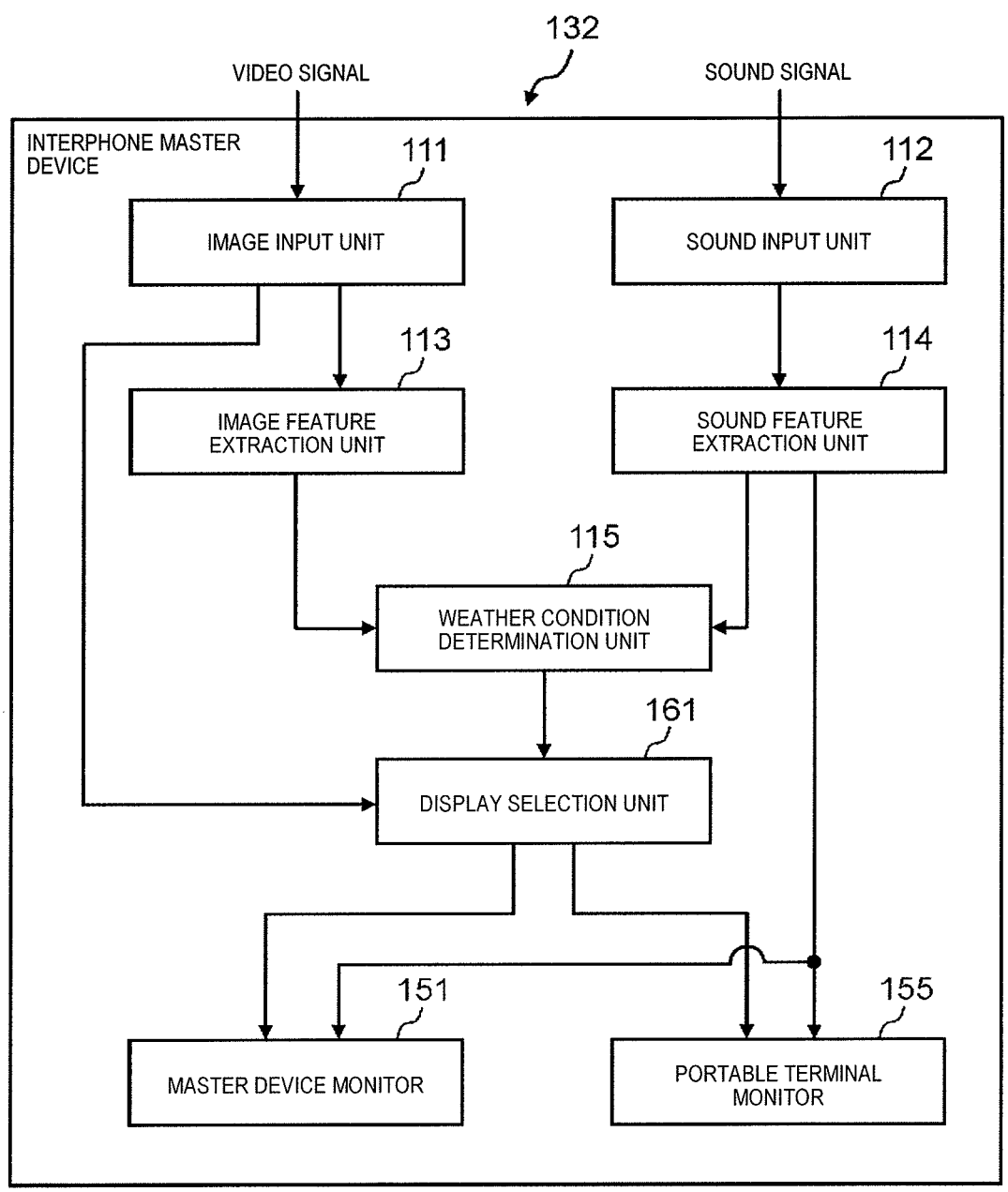
FIG. 15 is a functional block diagram of interphone master device 132 in FIG. 14.

FIG. 15 is a functional block diagram of interphone master device 132 in FIG. 14. As illustrated in FIG. 15, interphone master device 132 according to the third exemplary embodiment includes image input unit 111, sound input unit 112, image feature extraction unit 113, sound feature extraction unit 114, and weather condition determination unit 115 which have the same functions as those of image processing device 103 according to the second exemplary embodiment illustrated in FIG. 11.

In interphone master device 132, a captured image (hereinafter, referred to as an "input image") from image input unit 111 and a determination result of a weather condition from weather condition determination unit 115 are input to display selection unit 161. Display selection unit 161 selects an output destination (here, either one or both of master device monitor 151 of interphone master device 132 and portable terminal monitor 155 of portable terminal 133) of the captured image on the basis of an operation mode which is set in advance by the operation of display selection button 153, as an output destination of information regarding a weather condition. Display selection unit 161 can perform switching between an ON state and an OFF state of master device monitor 151, the change of image display contents, and the like on the basis of the determination result of the weather condition from weather condition determination unit 115. Weather condition determination unit 115 selects a message regarding a weather condition which is prepared in advance on the basis of the determination result of the weather condition, and selects and inputs the message to display selection unit 161 as a portion of the determination result of the weather condition.

In interphone master device 132 according to third exemplary embodiment, the same components (image sharpening unit 116, image selection unit 117, and the like) as those in the case of the second exemplary embodiment illustrated in FIG. 11 are provided, and thus it is also possible to adopt a configuration in which a noise removal image is displayed on master device monitor 151 or portable terminal monitor 155.

Figure 16:
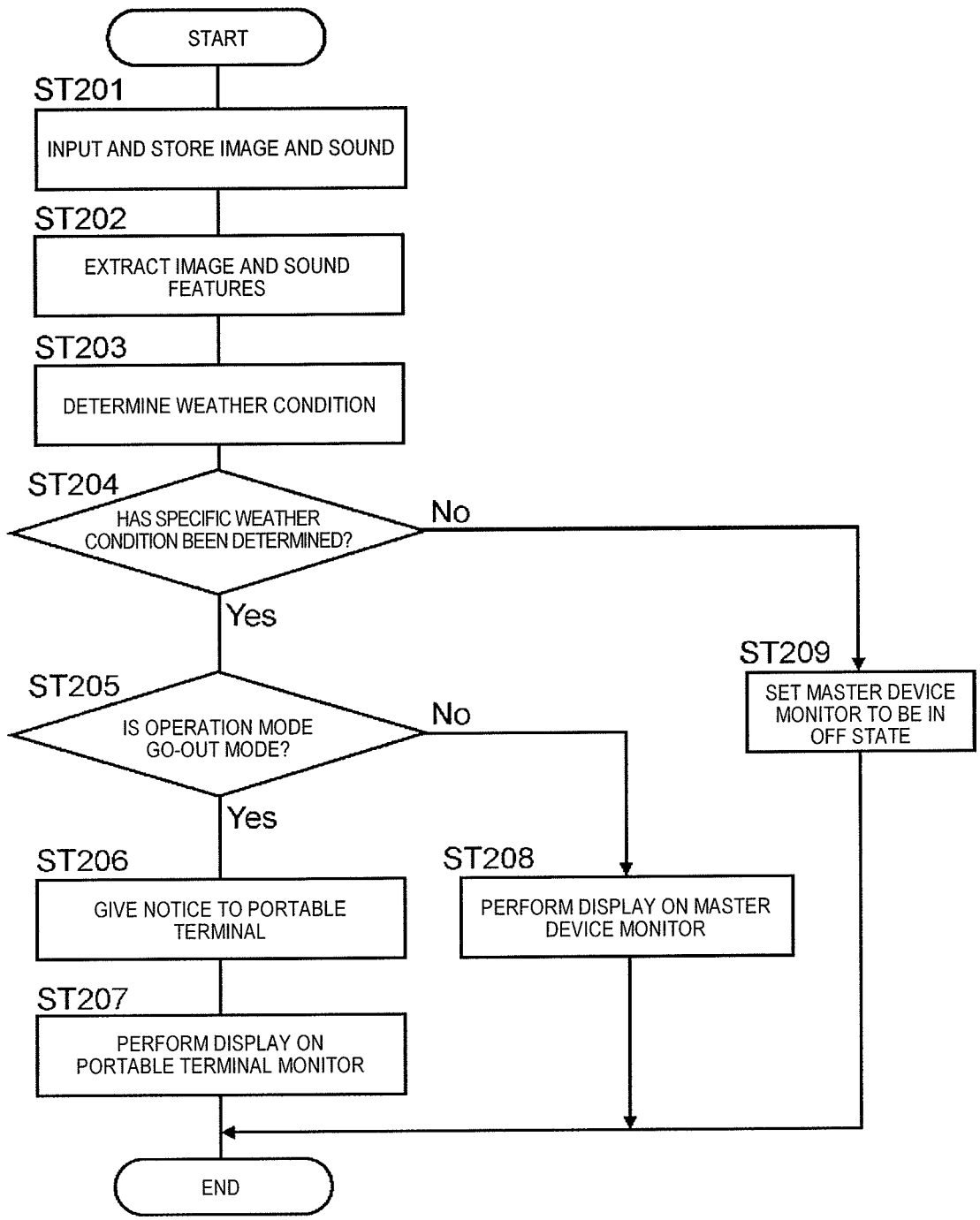
FIG. 16 is a flow chart illustrating a flow of processing performed by the monitoring system according to the third embodiment.
Figure 17:
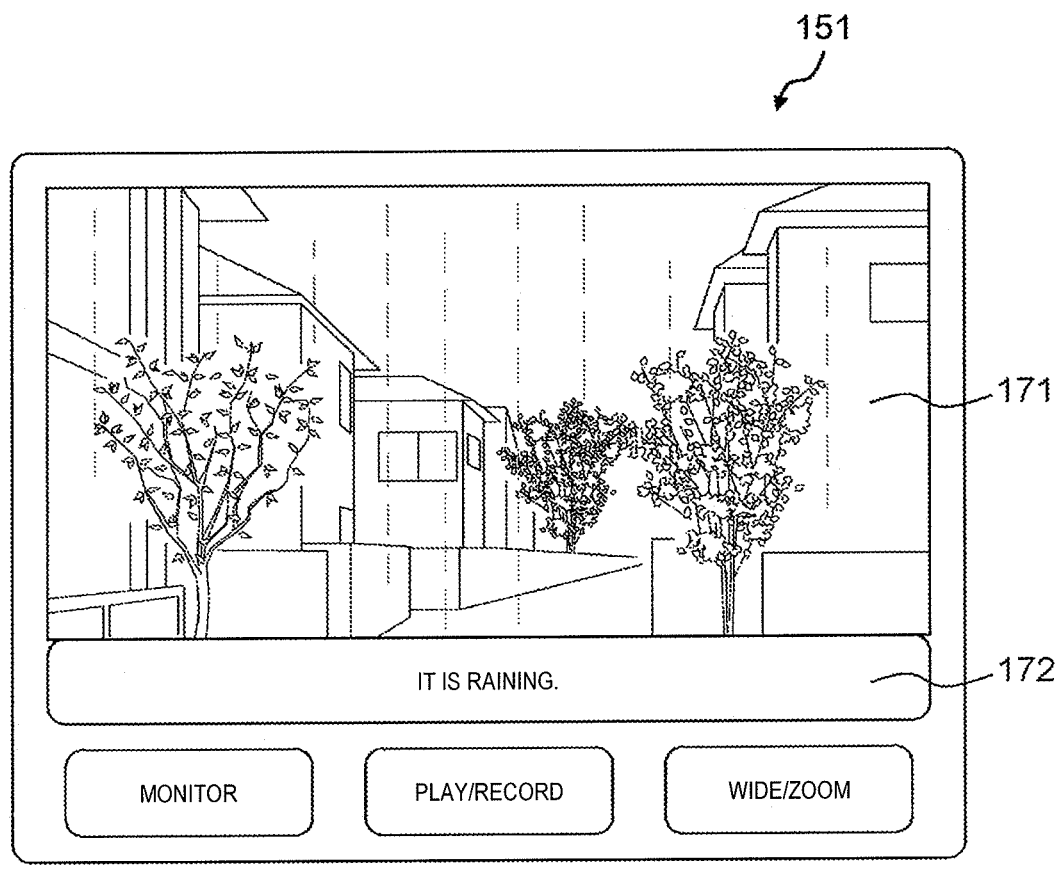
FIG. 17 is a diagram illustrating an example of image display in step ST208 in FIG. 16.

FIG. 16 is a flow chart illustrating a flow of processing performed by the monitoring system according to the third exemplary embodiment, and FIG. 17 is a diagram illustrating an example of image display in step ST208 in FIG. 16.

In monitoring system 101 according to the third exemplary embodiment, steps ST201 to ST204 which are the same as steps ST101 to ST103, and ST105 in the second exemplary embodiment illustrated in FIG. 13 are performed.

In step ST205, in a case where a go-out mode is selected as the operation mode of interphone master device 132 (Yes), display selection unit 161 notifies portable terminal 133 of the presence of information regarding a weather condition (ST206). Consequently, when a user of portable terminal 133 performs an operation of acquiring the information regarding the weather condition, the information regarding the weather condition is displayed on portable terminal monitor 155 (ST207). In step ST207, at least one of a captured image (a moving image or a still image) which is captured by camera 141 and a message regarding a weather condition is displayed on portable terminal monitor 155, as information regarding the weather condition. In this case, only the message regarding the weather condition is displayed, and thus it is possible to reduce the amount of data and to reduce a time required for the display. At this time, a peripheral sound acquired by microphone 142 can also be output from a speaker of portable terminal 133. A configuration may also be adopted in which the information regarding the weather condition pops up on portable terminal monitor 155, regardless of the operation of the user of portable terminal 133.

In step ST204, in a case where the specific weather condition has not been determined (No), image selection unit 117 sets master device monitor 151 to be in an OFF state or maintains an OFF state (ST209). Thereby, the user can recognize that the specific weather condition has occurred only in a case where master device monitor 151 is in an ON state (recognize, for example, changes in the weather such as starting to rain after fair weather).

In step ST205, in a case where a go-out mode has not been selected as the operation mode of interphone master device 132 (No), display selection unit 161 displays the information regarding the weather condition on master device monitor 151 (ST208). In step ST208, for example, as illustrated in FIG. 17, image display field 171 in which a captured image captured by camera 141 is displayed and message display field 172 in which the message regarding the weather condition is displayed are set in the screen of master device monitor 151. In monitoring system 101, it is possible to repeatedly perform steps ST201 to ST209 described above.

In addition to the disclosure of the third exemplary embodiment described above, the disclosed contents of the second exemplary embodiment described above and the disclosure of the fourth exemplary embodiment to be described later can also be applied. In particular, switching between the monitoring mode and the normal mode of the second exemplary embodiment described above may be performed during the go-out mode in step ST205 of the third exemplary embodiment.

In the case of the normal mode, display selection unit 161 notifies portable terminal 133 of the presence of the information regarding the weather condition, similar to ST206 in the third exemplary embodiment described above. Consequently, when the user of portable terminal 133 performs an operation of acquiring the information regarding the weather condition, the information regarding the weather condition is displayed on portable terminal monitor 155, similar to ST207.

In the case of the monitoring mode, display selection unit 161 notifies portable terminal 133 of an outdoor subject or a video which is captured by camera (image capture device) 141 of interphone slave device 131 and a peripheral sound (here, a sound particularly related to a weather condition such as rainfall, a hailstorm, or a thunderclap) which is acquired by microphone (sound input device) 142 during image capture, instead of the presence of the information regarding the weather condition in ST206 (ST206). Consequently, when the user of portable terminal 133 performs an operation of acquiring the outdoor subject or the video which is captured by camera 141 of interphone slave device 131 and the peripheral sound acquired by microphone (sound input device) 142, the outdoor subject or the video which is captured by camera 141 of interphone slave device 131 is displayed on portable terminal monitor 155 instead of displaying the information regarding the weather condition in ST207, and the peripheral sound acquired by microphone (sound input device) 142 is output from a speaker or an earphone jack included in the portable terminal.

Further, in the case of the monitoring mode, image blur may also be generated due to a storm or strong wind in a case of strong wind and rain, a rainstorm, strong wind and snow, or a snowstorm. In this case, it is possible to acquire an image from which noise has been more appropriately removed and to display the image on portable terminal monitor 155 by removing noise during rainfall or snowfall in the second exemplary embodiment and performing image blur correction in the fourth exemplary embodiment to be described later. In the normal mode, all of the noise removal according to the determination of a weather condition, the wiper removal, and the image blur correction may not be performed.

(Fourth Exemplary Embodiment)

Figure 18A:
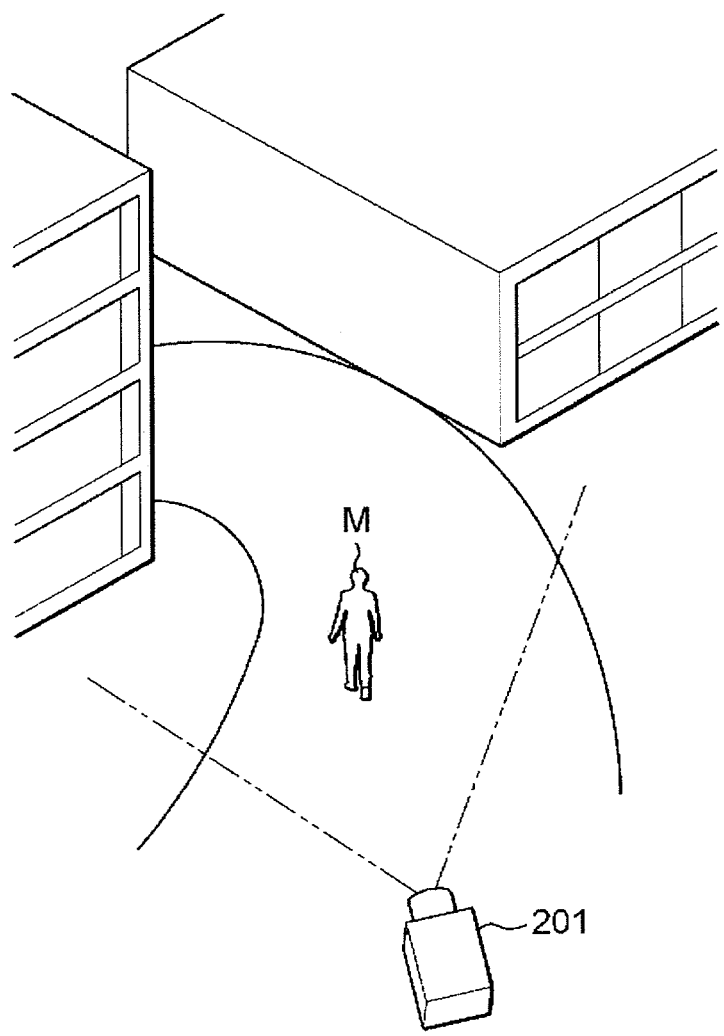
FIG. 18A is a schematic diagram illustrating an example of image capture performed by a video camera to which a fourth embodiment is applied.
Figure 18B:
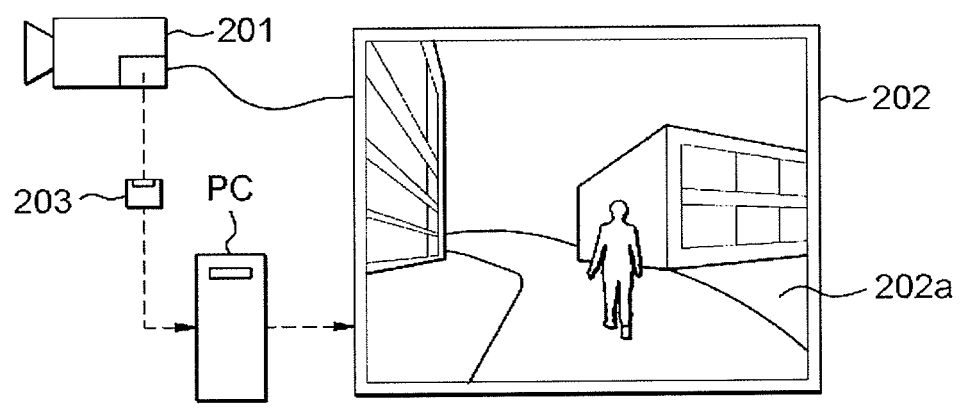
FIG. 18B is a schematic diagram illustrating an example of image capture performed by the video camera to which the fourth embodiment is applied.

FIGS. 18A and 18B are schematic diagrams illustrating an example of image capture performed by video camera 201 to which the fourth exemplary embodiment of the present disclosure is applied. FIG. 18A illustrates a scene in which subject M to be captured who goes ahead is captured by video camera 201 carried by a photographer (not shown), in the fourth exemplary embodiment of the present disclosure. Video camera 201 is a digital video camera, and is not limited to being carried by a hand. The video camera may be used by being mounted on the head (helmet or the like). FIG. 18B illustrates a case where an image captured by video camera 201 is shown on screen 202*a* of the monitor 202 as a video by directly connecting video camera 201 to monitor 202 or a case (a flow of a dashed line in the drawing) where image data of recording medium (memory card or the like) 203 mounted on video camera 201 is read out by personal computer PC, is subjected to image processing, and is output to monitor 202 connected to personal computer PC. In any case, image processing shown on screen 202*a* may be known image processing, and a description thereof will be omitted.

Figure 19A:
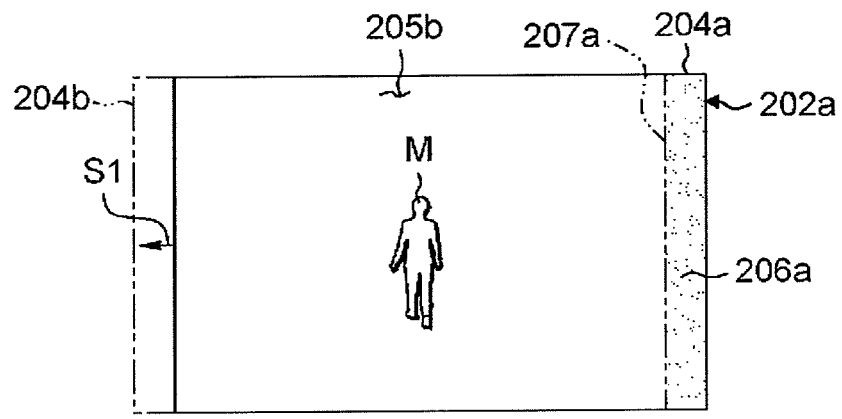
FIG. 19A is a schematic diagram illustrating a continuous change in a video shown on a screen by image processing according to the present disclosure.
Figure 19B:
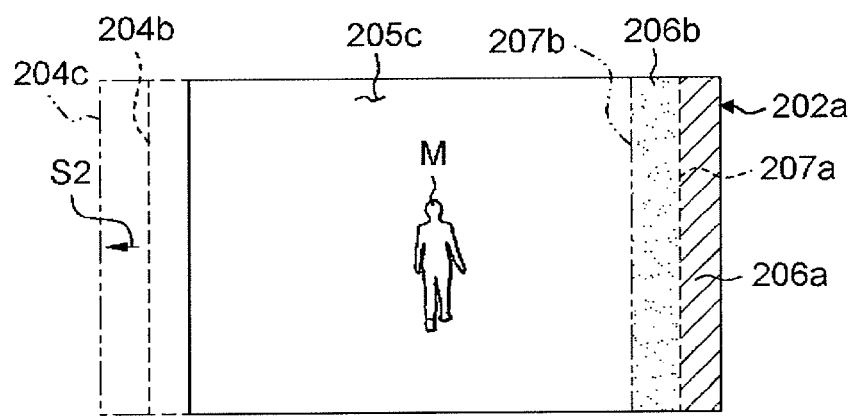
FIG. 19B is a schematic diagram illustrating a continuous change in a video shown on a screen by image processing based on the present disclosure.
Figure 19C:
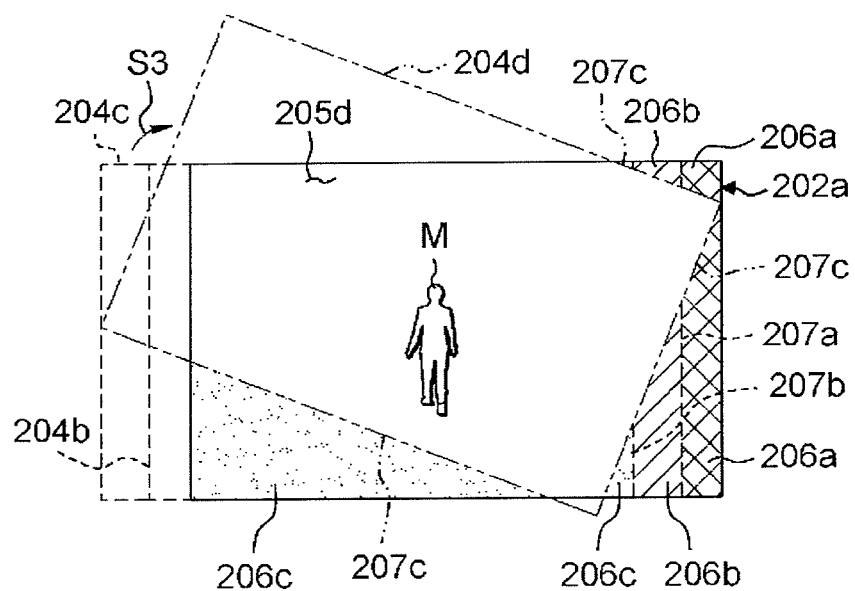
FIG. 19C is a schematic diagram illustrating a continuous change in a video shown on a screen by image processing based on the present disclosure.

FIGS. 19A to 19C are schematic diagrams illustrating continuous changes of the video shown on screen 202*a* of monitor 202 by image processing based on the present disclosure. The image blur correction in this exemplary embodiment may be processed using frames of continuous images by a known electronic method. For convenience of description, a description is given on the assumption that a display region of screen 202*a* and a region of image 204*a* (204*b*, 204*c*, 204*d*) which is obtained by video camera 201 have substantially the same area, but is not limited to being the same. In a case of high-resolution screen 202*a* having a large number of dots, the image is shown in a potion thereof.

A portion surrounded by a solid line of FIG. 19A is a display range of screen 202*a*. It is assumed that first image 204*a* is displayed in the entirety of screen 202*a* in the previous frame processing. On the other hand, a portion having the same area as screen 202*a* surrounded by an alternate long and two short dashes line is second image 204*b* which is input in the present frame processing. As described above, a deviation occurs in subject M in second image 204*b* with respect to first image 204*a* by image blur correction, and FIG. 19A illustrates an example of a case where parallel movement of second image 204*b* with respect to first image 204*a* is performed to the left indicated by arrow S1 in the drawing. In this example, a region shown within screen 202*a* of second image 204*b* serves as second correction image 205*b* as a correction image.

FIG. 19B based on the next frame processing illustrates an example of a case where third image 204*c* represented by an alternate long and two short dashes line is further moved to the left as described above with respect to second image 204*b* represented by a dashed line so as to be indicated by arrow S2 in the drawing. In this manner, a region shown within screen 202*a* of third image 204*c* having been subjected to image shift serves as third correction image 205*c*. Further, FIG. 19C based on the next frame processing illustrates an example of a case where fourth image 204*d* represented by an alternate long and two short dashes line is rotated to the right with respect to third image 204*c* represented by a dashed line so as to be indicated by arrow S3 in the drawing. In this manner, a region shown within screen 202*a* of fourth image 204*d* having been subjected to image shift serves as fourth correction image 205*d*.

Images 204*a* to 204*d* are shown by being shifted in order as described above by the frame processing of the image blur correction. Thus, in screen 202a, a region showing second to fourth correction images 205b to 205d and out-of-correction image regions 206a to 206c, other than correction images 205b to 205d, are generated from first image 204a equivalent to the first correction image.

In screen 202a illustrated in FIG. 19A, new out-of-correction image region 206a (portion shaded with dots) serving as a region other than second correction image 205b serving as a correction image of the present frame is generated on the right side in the drawing. In screen 202a illustrated in FIG. 19B based on the next frame processing, out-of-correction image region 206b (portion shaded with dots) different from out-of-correction image region 206a (hatched portion) of the previous frame is generated on the left side in the drawing of third correction image 205c serving as a correction image of the present frame. In FIG. 19C based on the next frame processing, new out-of-correction image region 206c (portion shaded with dots) is generated in a region different from out-of-correction image region 206b (hatched portion) serving as a previous frame and out-of-correction image region 206a (cross-hatched portion) serving as a frame prior to the previous frame by the rotation of fourth correction image 205d serving as a correction image of the present frame. In a case where out-of-region images in which gradation is applied to out-of-correction image regions 206a to 206c are described in the following description, the description will be given by denoting the same components by the same reference numerals and signs.

Next, a control knack for the above-described image processing will be described. This image processing is realized by, for example, a computer program, but is not limited to the computer program. A portion related to image blur correction is an example (for example, a matching method) in various known electronic image blur correction methods, and is not limited to a description to be given later.

Figure 20:
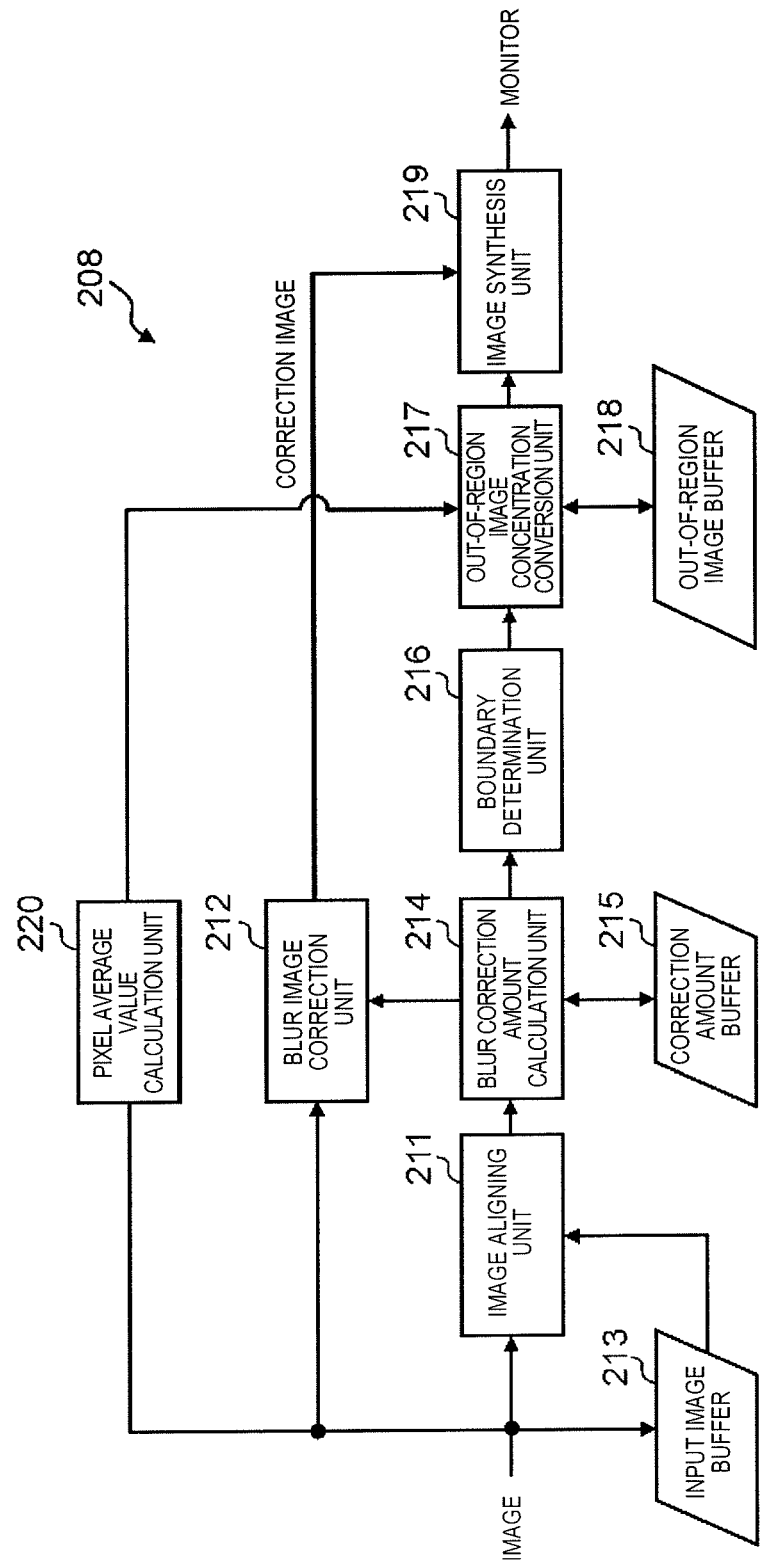
FIG. 20 is a block diagram illustrating a first example of an image processing device based on the fourth embodiment.

FIG. 20 is a block diagram illustrating a first example of image processing device 208 based on the present disclosure. As illustrated in the drawing, image processing device 208 includes image aligning unit 211 to which images (204a to 204d) captured by video camera 201 are input, blur image correction unit 212 to which the images (204a to 204d) are similarly input and the amount of blur correction from blur correction amount calculation unit 214 to be described later is input, input image buffer 213 that stores a predetermined number of frames of the input images (204a to 204d) in time series, blur correction amount calculation unit 214 to which image aligning information (motions between frame images) obtained by image aligning unit 211 is input, and correction amount buffer 215 that stores the amount of blur correction which is calculated by blur correction amount calculation unit 214. The units constitute an image blur correction mechanism.

Image processing device 208 is provided with pixel average value calculation unit 220, boundary determination unit (boundary determination means) 216, out-of-region image concentration conversion unit (gradation setting means) 217, out-of-region image buffer (image storage means) 218, and image synthesis unit (image generation means) 219. The pixel average value calculation unit receives inputs of the images (204a to 204d) captured by video camera 201. The boundary determination unit (boundary determination means) receives an input of the amount of blur correction of the present frame which is calculated by blur correction amount calculation unit 214 on the basis of the image aligning information and the amount of blur correction of the previous frame. The out-of-region image concentration conversion unit (gradation setting means) receives an input of information of an out-of-correction image region newly generated out of a correction image on the basis of the amount of blur correction of the present frame in boundary determination unit 216 and an input of a concentration average value of pixels of the entire region or a partial region of the images (204a to 204d) which is calculated by pixel average value calculation unit 220. The out-of-region image buffer (image storage means) stores an out-of-region image in which gradation is applied to the out-of-correction image region by out-of-region image concentration conversion unit 217. The image synthesis unit (image generation means) generates a synthetic image shown in the entirety of screen 202a on the basis of the out-of-region image from out-of-region image buffer 218 and the correction image from blur image correction unit 212. Image aligning unit 211, blur image correction unit 212, input image buffer 213, blur correction amount calculation unit 214, correction amount buffer 215, boundary determination unit 216 and out-of-region image buffer 218 are examples of image feature extraction units constituted by setting means of an out-of-correction region and storage means thereof. Pixel average value calculation unit 220, out-of-region image concentration conversion unit 217, and image synthesis unit 219 are examples of disturbance suppression units.

Figure 21:
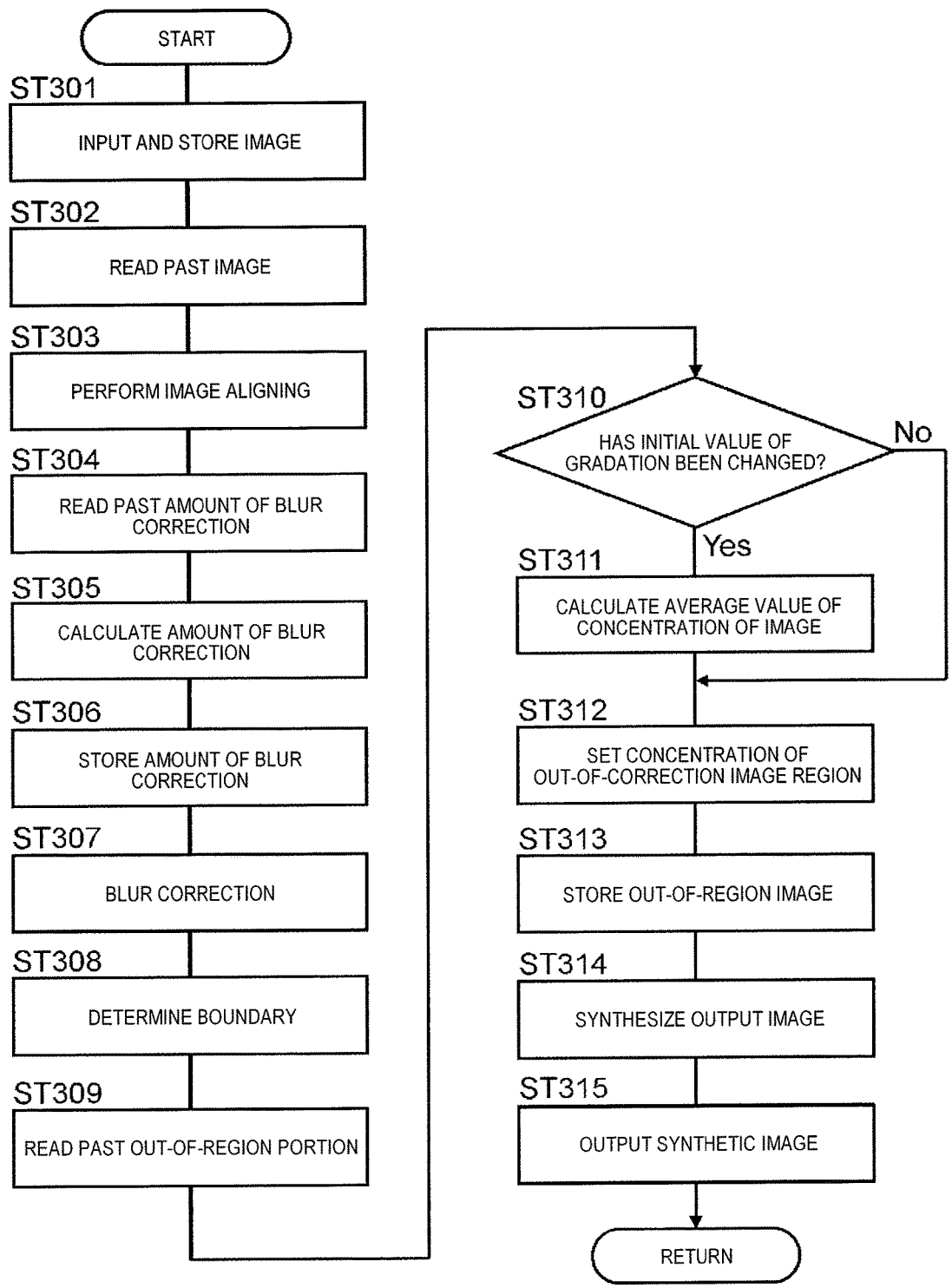
FIG. 21 is a flow chart corresponding to FIG. 20.

Next, a control knack according to the first example of image processing device 208 will be described with reference to a flow chart of FIG. 21. A description will be given from frame processing in which first image 204a which is an image of a previous frame is stored in input image buffer 213 and to which second image 204b is input.

In step ST301, second image 204b which is input directly from video camera 201 or from recording medium 203 mounted on personal computer PC is read to image aligning unit 211, blur image correction unit 212, input image buffer 213, and pixel average value calculation unit 220. Input image buffer 213 stores second image 204b. In step ST302, first image 204a is read to image aligning unit 211 from input image buffer 213.

In step ST303, image aligning unit 211 obtains, for example, a local motion vector of a separate block including subject M as image aligning information (the amount of parallel movement and a rotation angle) when aligning is performed, and performs aligning between both images 204a and 204b (see FIG. 19A). The local motion vector is used for the calculation of blur correction amount ΔW in the next steps ST304 to ST307.

In step ST304, blur correction amount ΔW(n−1) of the previous frame is read to blur correction amount calculation unit 214 from correction amount buffer 215. In step ST305, blur correction amount calculation unit 214 adds aligning information from image aligning unit 211 to blur correction amount ΔW(n−1) of the previous frame to thereby calculate blur correction amount ΔW(n) of the present frame. In step ST306, blur correction amount ΔW(n) of the present frame is stored in correction amount buffer 215.

In step ST307, an image having been subjected to blur correction by blur image correction unit 212 is segmented on the basis of blur correction amount ΔW(n) of the present frame. A segmentation result is second correction image 205b. In step ST308, boundary determination unit 216 determines the position of boundary (207a) generated in screen 202a by second correction image 205b on the basis of blur correction amount ΔW(n) of the present frame. For example, as illustrated in FIG. 19A, in a case where parallel movement of second image 204b is performed as indicated by arrow S1 in the drawing with respect to first image 204a shown in the entire range of screen 202a, blur correction amount ΔW(n) corresponds to the amount of parallel movement, and the position (coordinates) of boundary 207a can be determined by performing parallel movement of the edge (right edge in the example illustrated in the drawing) of first image 204a by blur correction amount ΔW(n). Boundary 207b and boundary 207c are similarly determined in the frame processing corresponding to FIG. 19B and the frame processing corresponding to FIG. 19C, respectively.

In step ST309, an out-of-region image of a previous frame is read out to out-of-region image concentration conversion unit 217 from out-of-region image buffer 218. In the example of FIG. 19A, first image 204a is a correction image of a previous frame, and second correction image 205b having been subjected to image shift with respect to the first image is shown. Thus, first out-of-correction image region 206a which is newly generated in screen 202a other than second correction image 205b serves as an out-of-region image. In the example of FIG. 19A, the out-of-region image of the previous frame is not stored, and thus, for example, null is set for each pixel of first out-of-correction image region 206a.

In the next step ST310, it is determined whether or not an initial value of gradation of an out-of-region image has been changed. Although gradation representing concentration will be used in the following description, it is assumed that the gradation refers to stepwise changes of contrasting density including shading.

In step ST310, in a case where it is determined that the initial value of the gradation has changed using an average value of concentration of the entire or partial region (for example, a region used in boundary 207a of FIG. 19A) of the present frame image, the processing proceeds to step ST311. In a case where it is determined that the initial value has not been changed (in a case where a constant value determined in advance is used), the processing proceeds to step ST312.

In step ST311, pixel average value calculation unit 220 calculates a concentration average value of second image 204b which is an input image second correction image 205b shown on screen 202a. The calculation of the concentration average value may be performed by various known filtering processes (for example, smoothing). As a concentration average value of pixels in a color image, an average value of concentrations of pixels may be obtained. However, an average value of pixels may be obtained after an average value for each of red, blue, and green color channels is calculated.

Figure 22A:
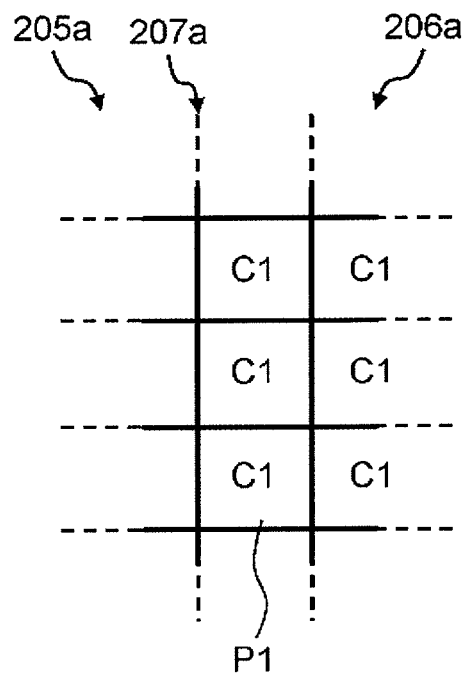
FIG. 22A is a schematic enlarged view of main portions corresponding to FIG. 19A.
Figure 22B:
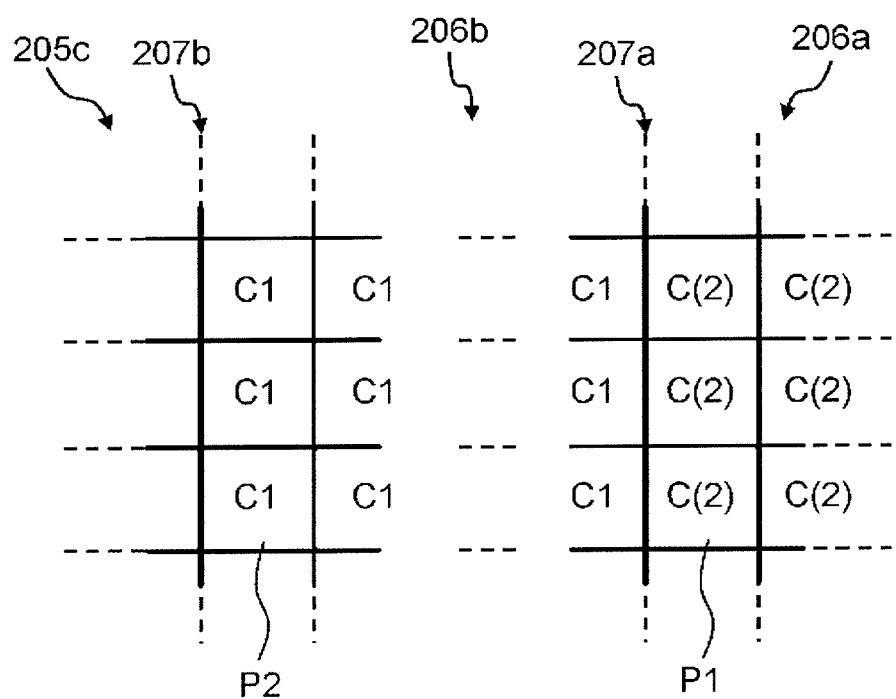
FIG. 22B is a schematic enlarged view of main portions corresponding to FIG. 19B.

Next, the knack of setting the concentration of an out-of-correction image region in step ST312 by out-of-region image concentration conversion unit 217 will be described with reference to FIGS. 22A and 22B. FIG. 22A is a schematic enlarged view of main portions corresponding to FIG. 19A, and FIG. 22B is a schematic enlarged view of main portions corresponding to FIG. 19B. The inside of a quadrilateral frame in the drawing corresponds to pixels (P1·P2).

Since out-of-correction image region 206a in FIG. 22A is newly generated by processing during the input of second image 204b, initial value C1 is set to be concentration setting value Ci of pixel P1 of out-of-correction image region 206a newly generated (Ci=C1).

Since out-of-correction image region 206b in FIG. 22B in a case where second image 204b is input is also newly generated by image blur correction processing during the input of third image 204c, initial value C1 is similarly set to be concentration setting value Ci of pixel P2. Out-of-correction image region 206a in FIG. 22B, which is generated by the previous frame processing, was generated in the past with respect to out-of-correction image region 206b which is newly generated by the present frame processing in FIG. 22B, and is positioned relatively farther than out-of-correction image region 206b which is newly generated with respect to third correction image 205c.

In this manner, the setting of concentration setting value C(n) for pixel P1 of out-of-correction image region 206a which was generated in the past is also performed in step ST312, and the setting knack thereof will also be described by taking FIG. 22B as an example.

FIG. 22B illustrates a case where out-of-correction image region 206b which is a region different from out-of-correction image region 206a of the previous frame is newly generated in screen 202a by third correction image 205c being shown on screen 202a. Concentration setting value C(1) of pixel P2 of out-of-correction image region 206b which is newly generated is initial value C1 as described above (C(1)=C1). In a case where a concentration setting value of pixel P1 of out-of-correction image region 206a of the previous frame is set to C(n) (n=2, 3, . . . ), a target value of concentration of an out-of-region image is set to Co, and the rate of change in concentration is set to coefficient K (0<K<1), concentration setting value C(n) may be obtained by Expression 1.

$$C(n)=(C(n-1)-Co)*K+Co \quad (1)$$

Target value Co may be set by appropriately selecting a value (concentration on a light side) corresponding to daytime image capture and a value (concentration on a dark side) corresponding to night-time image capture. The selection method may be a method of obtaining an average value of concentration for the entire or partial region of an input image and selecting a value having a great difference from the concentration average value (having a great difference in digitized concentration).

In pixel P1 of out-of-correction image region 206a, concentration setting value (C(1)) in FIG. 22A corresponding to first frame processing is initial value C1 as described above, but concentration setting value C(2) in FIG. 22B corresponding to second frame processing satisfies Expression 2 from Expression 1 described above.

$$C(2)=(C(1)-Co)*K+Co \quad (2)$$

For example, target value Co is set to concentration (a value close to 0) on a dark side, and thus the relationship of C1>Co is established. Since coefficient K is included in C(2), the relationship of C(2)<C(1)=C1 is established.

In the case of FIG. 19C, fourth image 204d is rotated, and out-of-correction image region 206b of the previous frame and a portion of out-of-correction image region 206a of a frame prior to the previous frame are overwritten in inverted commas by fourth correction image 205d. Out-of-correction image region 206c is newly generated in screen 202a. Initial value C1 is set for a concentration setting value of a pixel of out-of-correction image region 206c which is newly generated, and processing based on Expression 1 is performed on concentration setting values of pixels of portions of out-of-correction image region 206b of a previous frame and out-of-correction image region 206a of the frame which is prior to the previous frame, the portions remaining without being overwritten. In this case, corresponding concentration setting value C(3) of out-of-correction image region 206a of the frame which is prior to the previous frame satisfies the relationship of C(3)=(C(2)−Co)*K+Co<C(2). Corresponding concentration setting value C(2) of out-of-correction image region 206b of the previous frame is set to be a value obtained by Expression 2 described above. In this manner, concentration setting value C(n) of the present frame becomes smaller than concentration setting value C(n−1) of the previous frame (C(n)<C(n−1)), and approximates target value Co by repeating the processing.

In a case where it is determined in step ST310 that the initial value of gradation has been changed and the concentration of the out-of-correction image region is set in step ST312, the concentration of the pixel of first out-of-correction image region 206a which is newly generated in FIG. 19A is concentration based on the above-described concentration average value calculated in step ST311. In the entire screen 202a, concentration constituted by a concentration average value of second image 204b which is substantially the same as second correction image 205b is set for the pixel of first out-of-correction image region 206a, and thus boundary 207a becomes inconspicuous.

In the next step ST313, an out-of-region image having concentration setting value C(n) set therefor is stored in out-of-region image buffer 218. In step ST314, image synthesis unit 219 reads a correction image from blur image correction unit 212 and an out-of-region image having been subjected to concentration setting by out-of-region image concentration conversion unit 217, and synthesizes the images to thereby generate an output image (synthetic image). In the case of FIG. 19A, an out-of-region image (206a) stored in out-of-region image buffer 218 and second correction image 205b can be synthesized as illustrated in the drawing. In the next step ST315, the synthetic image (205b and 206a) which is output from image synthesis unit 219 is output to monitor 202. Thereby, a video as illustrated in FIG. 19A is displayed on screen 202a of monitor 202.

Subsequently, the above-described processing is performed from step ST301 after third image 204c is input, and the subsequent processing will be similarly repeated. The concentration of each of out-of-correction image regions 206a to 206c more approximates target value Co from initial value C1 as the region is generated at an earlier time by the above-described concentration setting in step ST312 which is performed in association with the repetition of the frame processing. Thereby, for example, in FIG. 19C, gradation smoothly changing from boundary 207c of fourth correction image 205d is applied to a portion of the out-of-region images (206a to 206c) in screen 202a, and flickering and the like due to the out-of-region images (206a to 206c) are reduced.

In this manner, different motions in the vicinity of continuous correction images 205b to 205d during the reproduction of a moving image become inconspicuous, which does not result in any trouble in a case where a noticeable object based on correction images 205b to 205d is viewed in screen 202a. Since boundaries 207a to 207c become inconspicuous, it is necessary to hide boundaries 207a to 207c by a mask as in the example of the related art. Accordingly, display regions of correction images 205b to 205d are not narrowed, thereby suppressing a reduction in the amount of information.

Next, a second example will be described below with reference to a block diagram of FIG. 23 and a flowchart of FIG. 24. The same components as those in the first example will be denoted by the same reference numerals and signs, and a detailed description thereof will be omitted.

Figure 23:
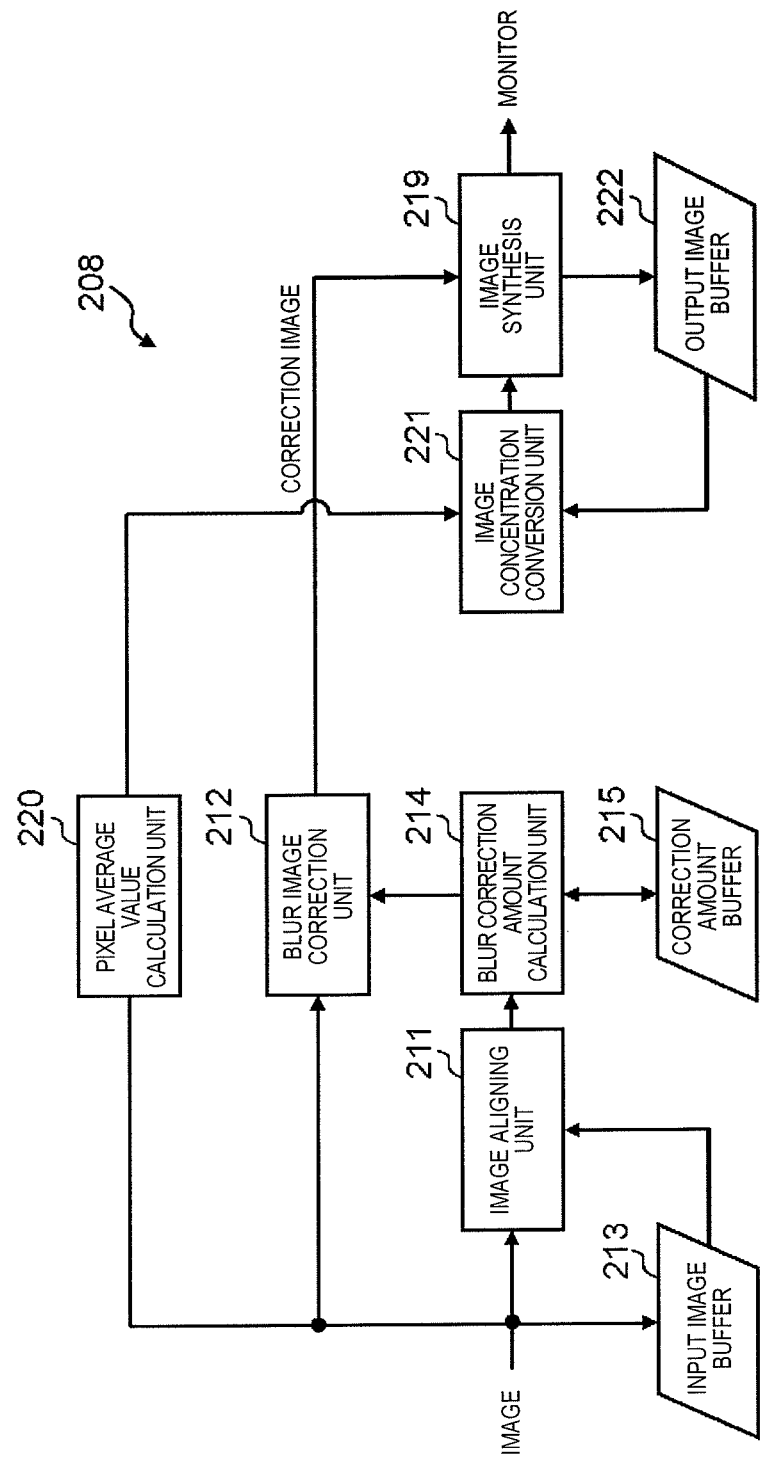
FIG. 23 is a block diagram illustrating a second example of the fourth embodiment of the image processing device.
Figure 24:
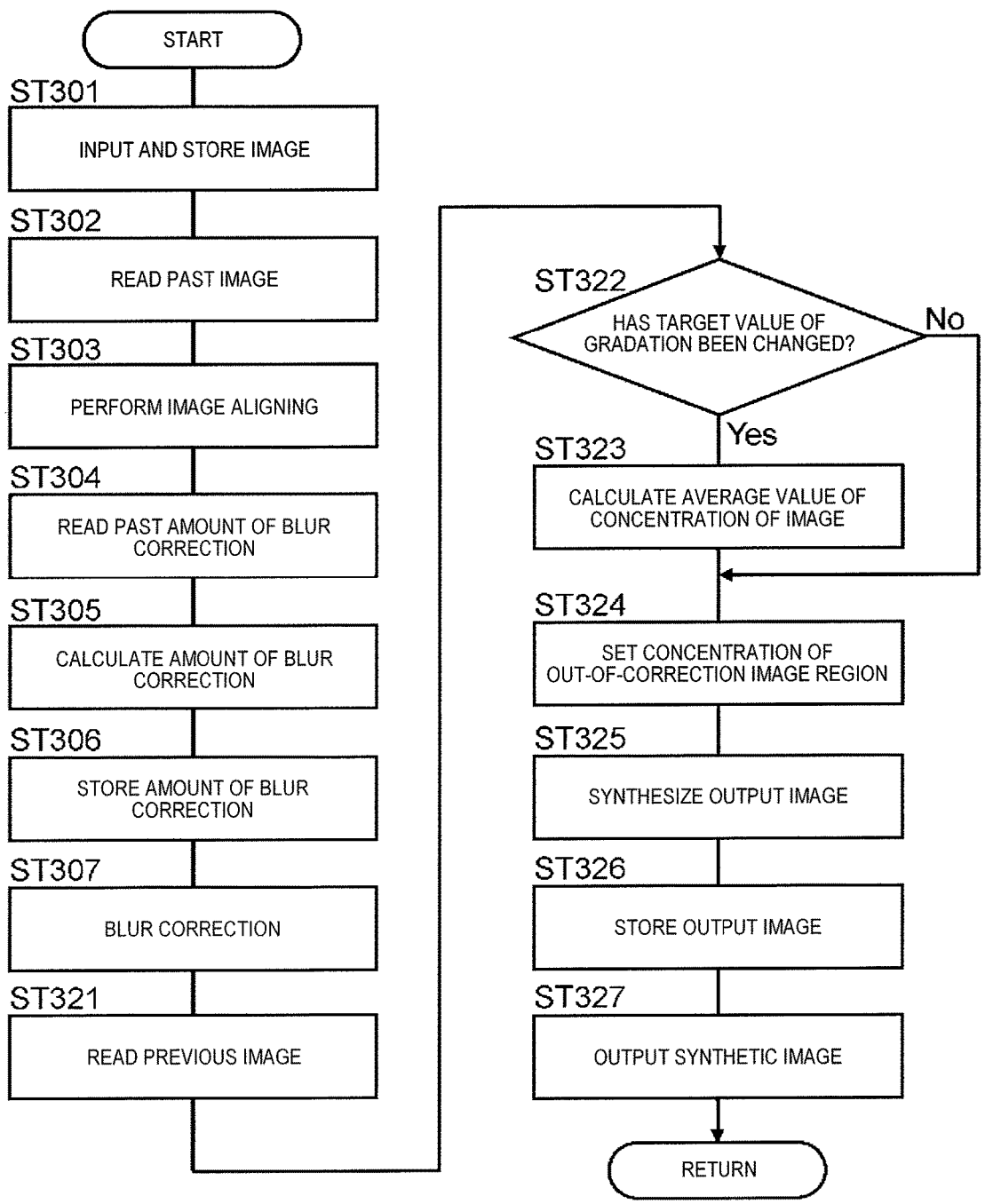
FIG. 24 is a flow chart corresponding to FIG. 23.

As illustrated in FIG. 23, with respect to the first example, boundary determination unit 216 is omitted, image concentration conversion unit (gradation setting means) 221 to which a concentration average value from pixel average value calculation unit 220 and a synthetic image from output image buffer 222 (to be described later) are input, and output image buffer (image storage means) 222 that stores a synthetic image which is output from image synthesis unit 219 are provided. A synthetic image of the previous frame from output image buffer 222 is input to image concentration conversion unit 221. The second example is different from the first example in that Image concentration conversion unit 221 converts concentration of the synthetic image of the previous frame on the basis of the concentration average value from pixel average value calculation unit 220, and a concentration conversion image having been subjected to concentration conversion is output to image synthesis unit 219, and the examples are the same as each other in the other respects. Image aligning unit 211, blur image correction unit 212, input image buffer 213, blur correction amount calculation unit 214, and output image buffer 222 are examples of image feature extraction units constituted by setting means of an out-of-correction region and storage means thereof. Pixel average value calculation unit 220, image concentration conversion unit 221, and image synthesis unit 219 are examples of disturbance suppression units.

The second example will be described with reference to a flow of FIG. 24. Steps ST301 to ST307 are the same as those in the first example. In step ST321 subsequent to step ST307, the synthetic image of the previous frame is read to image concentration conversion unit 221 from output image buffer 222. In a case where, for example, the frame processing of FIG. 19B is performed, the synthetic image of the previous frame becomes an image constituted by second correction image 205b and first out-of-region image (206a) of FIG. 19A. The synthetic image of the previous frame is stored in output image buffer 222 during frame processing of the previous frame in step ST324 to be described later. In the case of FIG. 19A, although not being synthesized, first image 204a is equivalent thereto.

In the next step ST322, it is determined whether or not a target value of gradation has been changed. The target value of gradation is equivalent to target value Co described above. A determination knack in step ST322 may be the same as that in step ST310 described above.

In step ST323 performed in a case where the target value of gradation has been changed, a concentration average value is calculated similar to step ST311 described above. In the next step ST324, image concentration conversion unit 221 converts the concentration of the synthetic image of the previous frame. The conversion of the concentration can be performed on pixels of the synthetic image of the previous frame by calculating concentration setting value C(n) on the basis of Expression 1 described above. In this case, initial value C1 is concentration of each pixel of the synthetic image of the previous frame, and a concentration conversion image is output to image synthesis unit 219 as a resultant of the conversion of the concentration of each pixel which is performed on the basis of Expression 1.

In the next step ST325, image synthesis unit 219 generates a synthetic image of the present frame on the basis of a correction image from blur image correction unit 212 and the synthetic image of the previous frame which has been subjected to the concentration conversion. In a case where the frame processing of FIG. 19B is performed as described above, the synthetic image of the present frame is constituted by third correction image 205c and first and second out-of-region images (206a and 206b).

In the next step ST326, the synthetic image generated in step ST325 is stored in output image buffer 222. In step ST327, the synthetic image which is output from image synthesis unit 219 is output to monitor 202. This flow is repeated, similar to the above-described example.

For example, in the example of FIG. 19B, third correction image 205c is input from blur image correction unit 212, and an image obtained by converting the concentration of the synthetic image (205b and 206a) of the previous frame is input from image concentration conversion unit 221, whereby a synthetic image (205c, 206a, and 206b) of the present frame is generated. In the second example, the concentration of each pixel is converted by Expression 1, out-of-region images (206a and 206b) are not filled at unitary concentration as in the first example, and the shapes of corresponding portions of images 204a and 204b are shown. At this time, for example, a second out-of-region image (206b) with reduced concentration contrast and a first out-of-region image (206a) with further reduced concentration contrast with respect to third correction image 205c are shown, and thus patterns of portions of the out-of-region images (206a·206b) other than third correction image 205c are thinned. Accordingly, even when a time lag occurs in a portion shown due to past images 204a and 204b, which does not bring a great feeling of strangeness in the entire screen 202a. A portion captured in the entirety of screen 202a is shown, thereby erasing an image in the related art in which an image is narrowed in a small region of the middle portion due to the vicinity of screen 202a being masked like a frame.

Next, a third example will be described below with reference to a block diagram of FIG. 25 and a flowchart of FIG. 26. The same components as those in the first example will be denoted by the same reference numerals and signs, and a detailed description thereof will be omitted.

Figure 25:
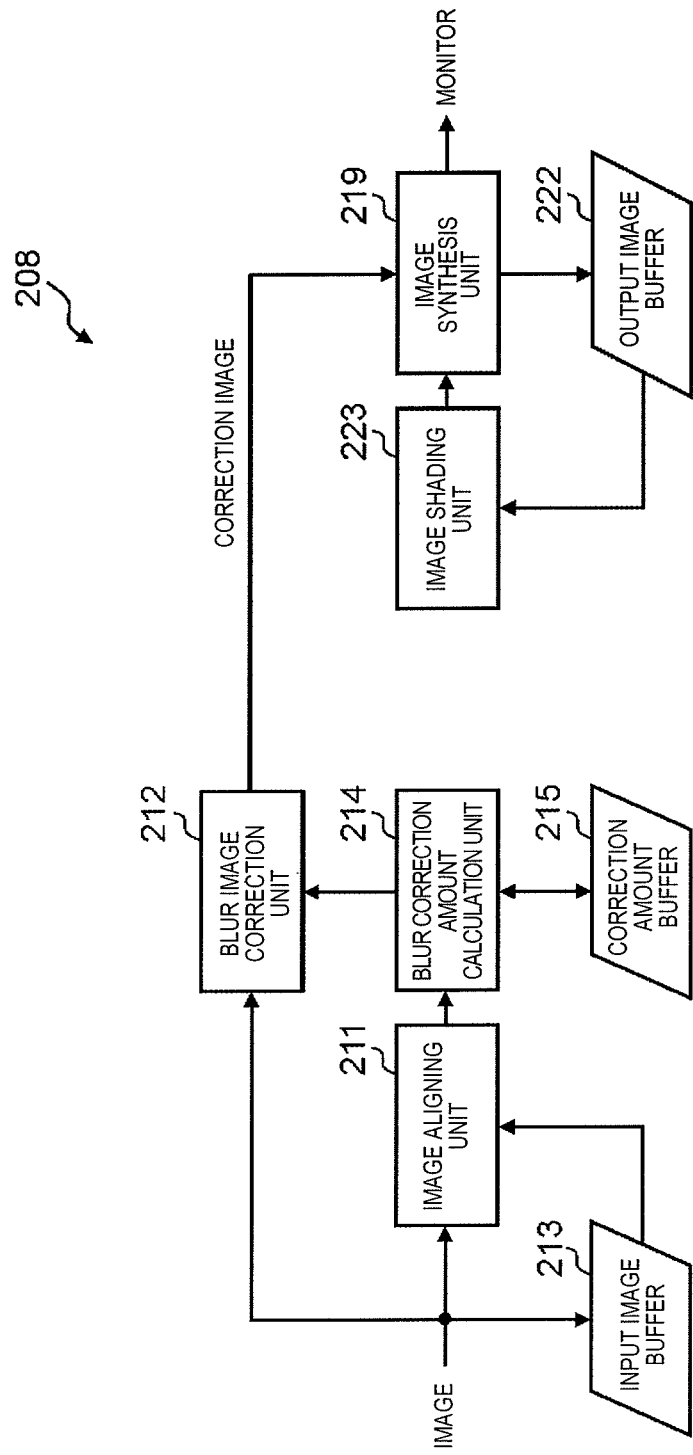
FIG. 25 is a block diagram illustrating a third example of the fourth embodiment of the image processing device.
Figure 26:
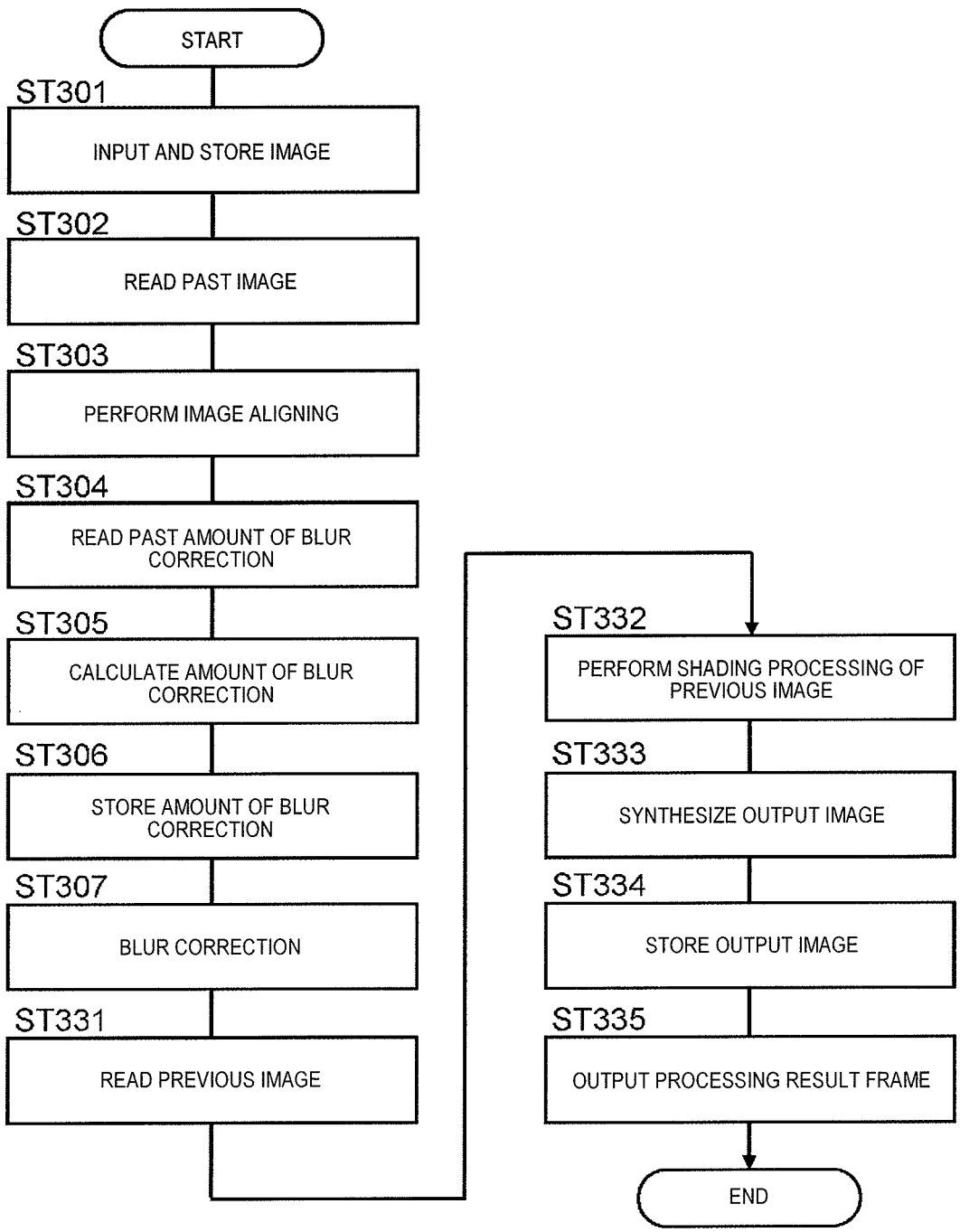
FIG. 26 is a flow chart corresponding to FIG. 25.

As illustrated in FIG. 25, the third example is different from the first example in that boundary determination unit 216 and pixel average value calculation unit 220 are omitted, output image buffer (image storage means) 222 storing a synthetic image which is output from image synthesis unit 219 and image shading unit (gradation setting means) 223 to which a synthetic image of a previous frame is input from output image buffer 222 are provided, and the synthetic image of the previous frame which has been subjected to shading processing is output to image synthesis unit 219 from image shading unit 223, and the examples are the same as each other in the other respects. Image aligning unit 211, blur image correction unit 212, input image buffer 213, blur correction amount calculation unit 214, and output image buffer 222 are examples of image feature extraction units constituted by setting means of an out-of-correction region and storage means thereof. In addition, image shading unit 223 and image synthesis unit 219 are examples of disturbance suppression units.

The third example will be described with reference to a flow of FIG. 26. Steps ST301 to ST307 are the same as those in the first example, and step ST331 is also the same as step ST321. In step ST332 subsequent to step ST331, shading processing is performed on an image of a previous frame which is read from output image buffer 222 by image shading unit 223. The shading processing may be processing using a spatial filter (for example, a spatial smoothing filter). Steps ST333 to ST335 are the same as steps ST324 to ST327. This flow is repeated, similar to the above-described example.

In this manner, shading processing is performed on the image of the previous frame, and the shading image and a correction image having been subjected to image shift of the present frame are synthesized. Thus, for example, in FIG. 19A, a portion, corresponding to first image 204a, which has been subjected to shading processing corresponds to a first out-of-region image (206a). Thereby, in the first out-of-region image (206a), a portion clearly shown in first image 204a has the feeling of being blurred without bringing the portion into focus, and thus the clearness of a portion serving as a video delayed with respect to second correction image 205b is reduced.

In FIG. 19B in the next frame processing, shading processing is further performed on first out-of-region image 206a. Since the shading processing is performed by a greater amount than shading processing performed on new second out-of-region image 206b, gradation having a greater amount of shading for the image (first out-of-region image 206a) generated at an earlier time is generated in first and second out-of-region images 206a and 206b which are out-of-region images of second correction image 205b. The same is true of FIG. 19C. In this manner, the same effects as those in the above-described examples can be obtained, and a video in the entire screen is prevented from being unnatural even when slight blur is generated in the entire screen 202a even by image blur correction, whereby an easily viewable moving image is obtained.

The disclosure of the fourth exemplary embodiment described above can also be applied to the first to third exemplary embodiments described above. In particular, in the vehicle-mounted camera disclosed in the first exemplary embodiment, image blur occurs due to the vibration of a car, and thus the image blur correction disclosed in the fourth exemplary embodiment may be applied to an image processing device that processes an image captured by the vehicle-mounted camera. In the determination of a weather condition disclosed in the second to third exemplary embodiments, a camera vibrates due to wind, an earthquake, or the like, which results in image blur. Accordingly, the image blur correction disclosed in the fourth exemplary embodiment may be applied to an image processing device that processes an image captured by the camera disclosed in the second to third exemplary embodiments.

A first disclosure contrived in order to solve the above-described problems relates to an image processing device for removing a visual field obstacle appearing as disturbance for a plurality of time-series images, the image processing device being configured to include image storage means (10) for storing a plurality of images arranged in time series, motion vector calculation means (12) for obtaining a motion vector for each of a plurality of relevant images adjacent to a predetermined processing target image on the basis of the processing target image in the plurality of images, image motion correction means (13) for performing motion correction of the plurality of relevant images on the basis of the motion vectors, and synthetic image generation means (14) for performing averaging processing of pixel values of the plurality of relevant images having been subjected to the motion correction and the processing target image to thereby generate a synthetic image corresponding to the processing target image.

Thereby, the synthetic image is generated by performing averaging processing (for example, processing using a median filter) of the pixel values of the relevant images having been subjected to motion correction and the processing target image, and thus pixels of the visual field obstacle appearing as disturbance for the processing target image are not used. Accordingly, it is possible to erase the visual field obstacle from the synthetic image and to suppress afterimage tear or partial disappearance by motion correction of the relevant images being performed for another moving subject which is not disturbance.

In a second disclosure according to the first disclosure, the image processing device is configured to further include revision region detection means (15) for detecting a revision region having the motion vector being equal to or greater than a threshold value from the processing target image, and motion vector revision means (16) for setting a revision motion vector being less than the threshold value in the revision region.

Thereby, a motion vector being less than the threshold value is set for the revision region in which the motion vector being equal to or greater than the threshold value is calculated, and thus it is possible to suppress the occurrence of disorder of an image due to a great motion vector of the revision region in the motion correction of the image.

In a third disclosure according to the second disclosure, the motion vector revision means sets a revision motion vector on the basis of motion vectors of portions corresponding to the revision regions of other relevant images with respect to the processing target image.

Thereby, the motion vector of the revision region is set by a motion vector in another relevant image, and thus it is possible to align the revision region with the motion vector of the relevant image and to generate an image that does not have a time difference from the revision region in a case where corresponding pixels in the relevant images are read to the revision region.

In a fourth disclosure according to the second disclosure, the revision motion vector is a median value of motion vectors of portions corresponding to the revision regions of other relevant images with respect to the processing target image.

Thereby, it is possible to use a known median filter and to easily perform the processing.

In a fifth disclosure according to the second disclosure, the motion vector revision means sets a revision motion vector on the basis of a motion vector in the vicinity of the revision region.

Thereby, it is possible to align the motion vector of the revision region with a peripheral motion vector being less than the threshold value and to obtain an image that does not bring a feeling of strangeness with respect to a peripheral motion.

In a sixth disclosure according to the second disclosure, the motion vector revision means sets the revision motion vector to 0.

Thereby, it is possible to simplify the setting of the motion vector of the revision region and to accelerate the processing.

In a seventh disclosure according to any of the second to fifth disclosures, the plurality of images are images captured by a vehicle-mounted camera mounted on an automobile, and the threshold value is set so that the motion of a wiper blade is detected when a wiper device is operated.

Thereby, the motion of the wiper blade during the operation of the wiper device becomes noise for scenery in an image, but the motion is detected and is set to be a revision region. Thus, it is possible to generate a synthetic image constituted by scenery from which the wiper blade is erased.

An eighth disclosure relates to an image processing method for removing a visual field obstacle appearing as disturbance for a plurality of time-series images, the image processing method being configured to include a process of storing a plurality of images arranged in time series, a process of obtaining a motion vector for each of a plurality of relevant images adjacent to a predetermined processing target image on the basis of the processing target image in the plurality of images, a process of performing motion correction of the plurality of relevant images on the basis of the motion vectors, and a process of performing averaging processing of pixel values of the plurality of relevant images having been subjected to the motion correction and the processing target image to thereby generate a synthetic image corresponding to the processing target image. Thereby, it is possible to exhibit the same effects as those in the first disclosure.

A ninth disclosure relates to an image processing device that removes noise caused by a weather condition during image capture by image processing, the image processing device being configured to include an image input unit to which a plurality of temporally continuous captured images are input, a sound input unit to which a peripheral sound acquired during the capture of a captured image is input, an image feature extraction unit that extracts an image feature related to the weather condition in the captured image, a sound feature extraction unit that extracts a sound feature related to a weather condition in a peripheral sound, a weather condition determination unit that determines the weather condition during the capture of the captured image on the basis of the image feature and the sound feature, and an image sharpening unit that performs image processing based on the weather condition determined by the weather condition determination unit to thereby remove noise in the captured image.

According to the image processing device of the ninth disclosure, it is possible to determine a weather condition by a simple configuration on the basis of a captured image and a peripheral sound during image capture in the image capture performed outdoors, and to acquire an image from which noise is appropriately removed by image processing based on the determined weather condition.

In a tenth disclosure according to the ninth disclosure, the sound feature extraction unit extracts at least one of the intensity and frequency of a sound in the peripheral sound as a sound feature.

According to the image processing device of the tenth disclosure, it is possible to determine the weather condition simply and with a high level of accuracy on the basis of at least one of the intensity and frequency of the sound in the peripheral sound.

In an eleventh disclosure according to the tenth disclosure, the weather condition determination unit determines a weather condition to be rainfall regardless of an image feature in a case where a sound feature of the rainfall is extracted by the sound feature extraction unit.

According to the image processing device of the eleventh disclosure, in a case where a sound feature of rainfall which is relatively easy to discriminate from other weather conditions is extracted, it is possible to acquire an image from which noise has been appropriately removed by image processing based on rainfall, without being affected by an image feature of rainfall which is relatively difficult to discriminate from other weather conditions.

In a twelfth disclosure according to the tenth or eleventh disclosure, the weather condition determination unit determines a weather condition to be a hailstorm regardless of an image feature in a case where a sound feature of the hailstorm is extracted by the sound feature extraction unit.

According to the image processing device of the twelfth disclosure, in a case where a sound feature of a hailstorm which is relatively easy to discriminate from other weather conditions is extracted, it is possible to acquire an image from which noise has been appropriately removed by image processing based on the hailstorm, without being affected by an image feature of the hailstorm which is relatively difficult to discriminate from other weather conditions.

In a thirteenth disclosure according to any one of the ninth to twelfth disclosures, the image feature extraction unit extracts a change in the brightness of a pixel in a captured image as an image feature, and the weather condition determination unit determines thunder in a weather condition on the basis of the change in the brightness.

According to the image processing device of the thirteenth disclosure, it is possible to determine the occurrence of thunder (wildfire) simply and with a high level of accuracy on the basis of the change in the brightness in the captured image.

In a fourteenth disclosure according to the thirteenth disclosure, the weather condition determination unit determines a weather condition to be thunder regardless of a sound feature in a case where an image feature of the wildfire is extracted by the image feature extraction unit.

According to the image processing device of the fourteenth disclosure, in a case where an image feature of wildfire which is relatively easy to discriminate from other weather conditions is extracted, it is possible to acquire an image from which noise is appropriately removed by image processing based on thunder (wildfire), without being affected by a sound feature of a thunderclap (in particular, by a thunderclap which is not accompanied by wildfire unrelated to noise of an image).

In a fifteenth disclosure according to any one of the ninth to fourteenth disclosures, the image sharpening unit does not perform image processing in a case where the weather condition determined by the weather condition determination unit is other than a specific weather condition.

According to the image processing device of the fifteenth disclosure, in a case of a weather condition (that is, a case of a weather condition in which noise of an image is not generated) other than a specific weather condition (for example, rainfall, snowfall, a hailstorm, thunder, or the like), image processing is stopped, and thus it is possible to prevent a captured image from being deteriorated due to the execution of unnecessary image processing.

A sixteenth disclosure relates to a monitoring system including the image processing device according to any one of the ninth to fifteenth disclosures, an image capture device that inputs a captured image to the image input unit, and a sound input device that inputs a peripheral sound to the sound input unit.

A seventeenth disclosure relates to an image processing method of removing noise caused by a weather condition during image capture from a captured image by image processing, the image processing method including an image input step of inputting a plurality of temporally continuous captured images, a sound input step of inputting a peripheral sound acquired during capture of a captured image, an image feature extraction step of extracting an image feature related to the weather condition in the captured image, a sound feature extraction step of extracting a sound feature related to a weather condition in a peripheral sound, a weather condition determination step of determining a weather condition during the capture of the captured image on the basis of the image feature and the sound feature, and an image sharpening step of performing image processing based on the weather condition determined in the weather condition determination step to thereby remove noise in the captured image.

An eighteenth disclosure relates to an image processing device that performs image shift of continuously captured images by image blur correction to generate a correction image shown on a screen, the image processing device being configured to include out-of-region setting means for, in a case where a portion having a correction image of a present frame not shown therein by image blur correction is generated with respect to a region of a correction image of a previous frame shown on a screen, setting the portion to be an out-of-correction image region, storage means for sequentially storing the out-of-correction image regions, gradation setting means for applying gradation to the plurality of out-of-correction image regions, and image generation means for generating a synthetic image constituted by out-of-region images obtained by applying gradation to the plurality of out-of-correction image regions and the correction image so that the synthetic image is shown on the screen.

Thereby, the correction image obtained by performing image blur correction on a captured image is shown on a screen with a resolution of a light receiving element, and thus the resolution of a correction image is held. In addition, even when an out-of-correction image region constituted by a portion not shown on the screen is generated due to the deviation of the correction image which is caused by image shift of the image blur correction, the out-of-correction image region becomes inconspicuous by applying gradation to the out-of-correction image region, and unnaturalness of the out-of-correction image region shown on the screen is solved, whereby a reduction in display efficiency in the screen can be suppressed.

In a nineteenth disclosure according to the eighteenth disclosure, the storage means stores the synthetic image, the gradation setting means performs shading processing on the synthetic image of the previous frame which is stored in the image storage means and outputs a shading image having been subjected to the shading processing to the image generation means, and the image generation means uses a corresponding portion of the shading image in an out-of-region image.

Thereby, a shading image which is not that different from a correction image is shown in a region close to a correction image of an out-of-region image. Thus, an image is shown in a wide range of a screen with respect to only the correction image being shown in a portion of the screen, and the degree of shading is increased in a case where an out-of-correction image region of a previous frame is left and shown. Therefore, unnaturalness accompanied by a time difference occurring due to a video of the previous frame is suppressed.

In a twentieth disclosure according to the eighteenth disclosure, the gradation changes to either light or shade in accordance with average concentration of the correction image.

Thereby, in a case of daytime image capture, the entire correction image is bright. Accordingly, in this case, the correction image is changed to become dark as a region of an out-of-region image is generated at an earlier time. In contrast, in a case of night-time image capture, the entire correction image is dark. Accordingly, in this case, the correction image is changed to become bright as a region of the out-of-region image is generated at an earlier time. Therefore, there is no sudden change in a bright portion in the out-of-region image with respect to the correction image, and thus it is possible to prevent a video from becoming unnatural.

In a twenty-first disclosure according to the twentieth disclosure, the average concentration is an average value of concentration of a predetermined region which is present at substantially constant concentration in the correction image.

Thereby, in a case where the correction image includes a predetermined region, such as a blue sky, which is shown at substantially a constant concentration, average concentration of the predetermined region is set to be average concentration of the correction image, and thus it is possible to determine concentration for changing gradation without obtaining average concentration for the entire correction image. Therefore, it is possible to apply gradation through simple processing.

In a twenty-second disclosure according to the twentieth or twenty-first disclosure, an initial value or a target value of gradation of the out-of-region image is average concentration.

Thereby, the initial value or the target value of the gradation of the out-of-region image which is generated by the correction image of the present frame is average concentration of the correction image. Thus, a boundary between the out-of-region image and the correction image becomes inconspicuous, and it is not necessary to hide the boundary by a mask. Therefore, a display region of the correction image is not narrowed, and thus a reduction in the amount of information is suppressed.

A twenty-third disclosure relates to an image processing method of performing image shift of continuously captured images by image blur correction to generate a correction image shown on a screen, the image processing method being configured to include a process of, in a case where a portion having a correction image of a present frame not shown therein by image blur correction is generated with respect to a region of a correction image of a previous frame shown on a screen, setting the portion to be an out-of-correction image region, a process of sequentially storing the out-of-correction image regions, a process of applying gradation to the plurality of out-of-correction image regions, a process of generating a synthetic image constituted by the correction image and an out-of-region image which is out of a region of the correction image so that the synthetic image is shown on the screen, and a process of generating a synthetic image constituted by out-of-region images obtained by applying gradation to the plurality of out-of-correction image regions and the correction image so that the synthetic image is shown on the screen. Thereby, it is possible to exhibit the same effects as those in the eighteenth disclosure.

As described above, the present disclosure has been described with reference to the examples of the preferred exemplary embodiments. However, the present disclosure is not limited to the examples so that those skilled in the art can easily understand, and can be appropriately modified without departing from the scope of the present disclosure. In the above-described exemplary embodiments, wiper blade 6 has been described as a visual field obstacle. However, the present disclosure is not limited to wiper blade 6, and is effective in a case where a visual field obstacle having a different motion for scenery desired to be captured. For example, rain during rainfall, water droplets flowing down on a lens surface of a camera, or the like can be set to be an object. In addition, for example, the determination of a weather condition according to this exemplary embodiment is not limited to aiming to remove noise in a captured image, and can also be used for the purpose of simply automatically determining the outdoor weather. Further, for example, in the above-described exemplary embodiments, an example of image blur correction in which subject M is located at substantially the middle position in a correction image has been described, but the present disclosure can also be applied to a case where image blur correction is performed without specifying a subject. In this case, reset is once performed in a case where a display range of a correction image accounts for equal to or less than a predetermined proportion of the entirety of screen 202*a*, an image which is input at that time is displayed on screen 202*a*, and the above-described image processing may be performed again. Images that are continuously input may not be processed every time, or processing may be performed any number of times. Further, all of the components described in the above-described exemplary embodiments are not necessarily essential components, and can be appropriately selected without departing from the scope of the present disclosure.

INDUSTRIAL APPLICABILITY

The image processing device and the image processing method according to the present disclosure allow an image having no noise caused by a visual field obstacle moving at higher speed than the movement of scenery to be obtained, and are useful for a vehicle-mounted camera, a monitoring camera, and the like. The image processing device, the monitoring system provided with the same, and the image processing method according to the present disclosure are useful as an image processing device, a monitoring system provided with the same, an image processing method, and the like which are capable of determining a weather condition by a simple configuration during image capture performed outdoors, acquiring an image from which noise is appropriately removed by image processing based on the determined weather condition, and removing noise (visual field obstacle) caused by a weather condition, such as snowfall, during image capture from a captured image by image processing. Further, the image processing device according to the present disclosure can prevent a video from becoming unnatural in a case where a correction image obtained by electronic image blur correction is shown on a screen, and thus is useful as a video camera performing image capture while moving, and the like.

REFERENCE MARKS IN THE DRAWINGS

1 automobile
4*a* screen
5 image processing device
6 wiper blade (visual field obstacle)
10 input image buffer (image storage means)
11 image setting unit
12 motion vector calculation unit (motion vector calculation means)
13 frame motion correction unit (image motion correction means)
14 image synthesis unit (synthetic image generation means)
15 revision region detection unit (revision region detection means)
16 revision region revising unit (motion vector revision means)
101 monitoring system
102 monitoring camera (image capture device)
103 image processing device
105 microphone (sound input device)
111 image input unit
112 sound input unit 113 image feature extraction unit
114 sound feature extraction unit
115 weather condition determination unit
116 image sharpening unit
117 image selection unit
131 interphone slave device
132 interphone master device (image processing device)
133 portable terminal
141 camera (image capture device)
142 microphone (sound input device)
151 master device monitor
153 display selection button
155 portable terminal monitor
161 display selection unit
201 video camera
202a screen
204a to 204d first to fourth images
205a to 205d first to fourth correction images
206a to 206c first to third out-of-correction image region (out-of-region image)
207a to 207c boundary
208 image processing device
211 image aligning unit
212 blur image correction unit
213 input image buffer
214 blur correction amount calculation unit
215 correction amount buffer
216 boundary determination unit (boundary determination means)
217 out-of-region image concentration conversion unit (gradation setting means)
218 out-of-region image buffer (image storage means)
219 image synthesis unit (image synthesis means)
220 pixel average value calculation unit
221 image concentration conversion unit (gradation setting means)
222 output image buffer (image storage means)
223 image shading unit (gradation setting means)

The invention claimed is:

1. An image processing device that removes noise caused by disturbance during image capture from a captured image by image processing, the image processing device comprising:
   a processor; and
   a memory including instructions that, when executed by the processor, cause the processor to perform operations including:
      receiving input of a plurality of temporally continuous captured images;
      extracting a feature related to the disturbance in the captured image; and
      suppressing influence of the disturbance on the captured image in accordance with the feature related to the disturbance,
   wherein the disturbance is a visual field obstacle that appears in a plurality of time-series captured images, the operations further including:
      storing the plurality of captured images arranged in time series;
      obtaining a motion vector for each of a plurality of relevant images adjacent to a predetermined processing target image based on the processing target image in the plurality of captured images;
      detecting a revision region having the motion vector being equal to or greater than a threshold value from the processing target image;
      setting a revision motion vector being less than the threshold value in the revision region;
      performing motion correction of the plurality of relevant images based on the motion vectors;
      performing averaging processing of pixel values of the plurality of relevant images having been subjected to the motion correction and the processing target image;
      generating a synthetic image corresponding to the processing target image.

2. The image processing device according to claim 1, the operations further including:
   setting the revision motion vector based on motion vectors of portions corresponding to the revision regions of the other relevant images with respect to the processing target image.

3. The image processing device according to claim 2, wherein the revision motion vector is a median value of motion vectors of portions corresponding to the revision regions of the other relevant images with respect to the processing target image.

4. The image processing device according to claim 1, the operations further including:
   setting the revision motion vector based on a motion vector in a vicinity of the revision region.

5. The image processing device according to claim 1, the operations further including:
   setting the revision motion vector to 0.

6. The image processing device according to claim 1, wherein the plurality of images is captured by a vehicle-mounted camera mounted on an automobile,
   the operations further including setting the threshold value so that motion of a wiper blade is detected during operation of a wiper device.

7. The image processing device according to claim 6, the operations further including:
   switching between a monitoring mode for performing image removal processing of the wiper blade during operation of the wiper device and a normal mode for preventing the image removal processing of the wiper blade during operation of the wiper device from being performed.

8. An image processing device that removes noise caused by disturbance during image capture from a captured image by image processing, the image processing device comprising:
   a processor; and
   a memory including instructions that, when executed by the processor, cause the processor to perform operations including:
      receiving input of a plurality of temporally continuous captured images;
      extracting a feature related to the disturbance in the captured image; and
      suppressing influence of the disturbance in the captured image in accordance with the feature related to the disturbance,
   wherein the disturbance is a weather condition during image capture, the operations further including:
      extracting an image feature related to the weather condition in the captured image;
      receiving an input of a peripheral sound acquired during capture of the captured image;
      extracting a sound feature related to the weather condition in the peripheral sound;

determining the weather condition during capture of the captured image based on the image feature and the sound feature related to the weather condition in the captured image; and performing image processing based on the determined weather condition to thereby remove noise in the captured image.

9. The image processing device according to claim 8, the operations further including:

extracting at least one of intensity and frequency of a sound in the peripheral sound as the sound feature.

10. The image processing device according to claim 9, the operations further including:

determining the weather condition to be rainfall regardless of the image feature, when a sound feature of the rainfall is extracted.

11. The image processing device according to claim 9, the operations further including:

determining the weather condition to be a hailstorm regardless of the image feature, when a sound feature of the hailstorm is extracted.

12. The image processing device according to claim 8, the operations further including:

extracting a change in brightness of a pixel in the captured image as the image feature; and determining thunder in the weather condition based on the change in brightness.

13. The image processing device according to claim 12, the operations further including:

determining the weather condition to be thunder regardless of the sound feature, when an image feature of wildfire is extracted.

14. The image processing device according to claim 8, the operations further including:

setting a non-execution mode of the image processing when the determined weather condition is other than a specific weather condition.

15. The image processing device according to claim 14, further comprising:

switching between a monitoring mode for removing noise in the captured image by performing image processing based on the determined weather condition and a normal mode for preventing noise in the captured image from being removed by setting a non-execution mode of the image processing based on the determined weather condition.

16. A monitoring system comprising:
the image processing device according to claim 8;
an image capture device that inputs the captured image to the image processing device; and
a sound input device that inputs the peripheral sound to the image processing device.

17. The monitoring system according to claim 16, the operations further including:

switching between a monitoring mode for performing image processing based on the feature related to the disturbance and a normal mode for preventing the image processing based on the feature related to the disturbance from being performed.

18. An image processing device that removes noise caused by disturbance during image capture from a captured image by image processing, the image processing device comprising:

a processor; and
a memory including instructions that, when executed by the processor, cause the processor to perform operations including:

receiving input of a plurality of temporally continuous captured images;

extracting a feature related to the disturbance in the captured image; and suppressing influence of the disturbance on the captured image in accordance with the feature related to the disturbance, wherein a correction image to be shown on a screen is generated by performing image shift of image blur occurring as the disturbance in the continuously captured images, the operations further including:

setting, when a portion having the correction image of a present frame not shown therein by the image blur correction is generated with respect to a region of the correction image of a previous frame shown on the screen, the portion to be an out-of-correction image region; and storing the out-of-correction image regions sequentially;

applying gradation to the plurality of out-of-correction image regions; and generating a synthetic image constituted by out-of-region images obtained by applying the gradation to the plurality of out-of-correction image regions and the correction image so that the synthetic image is shown on the screen.

19. The image processing device according to claim 18, wherein the storage stores the synthetic image, the operations further including:

shading processing on the synthetic image of the previous frame which is stored in the image storage;

outputting a shading image having been subjected to the shading processing to the image generation means; and using a corresponding portion of the shading image in the out-of-region image.

20. The image processing device according to claim 18, wherein the gradation changes to light or shade in accordance with an average concentration of the correction image.

21. The image processing device according to claim 20, wherein the average concentration is an average value of concentration of a predetermined region which is present at substantially constant concentration in the correction image.

22. The image processing device according to claim 20, wherein an initial value or a target value of the gradation of the out-of-region image is the average concentration.

23. The image processing device according to claim 18, the operations further including:

switching between a monitoring mode for performing the image blur correction and a normal mode for preventing the image blur correction from being performed.

24. An image processing method of removing noise caused by disturbance during image capture from a captured image by image processing, the image processing method comprising:

inputting a plurality of temporally continuous captured images;

extracting an image feature related to the disturbance in the captured image; and suppressing influence of the disturbance on the captured image in accordance with the feature related to the disturbance, wherein the disturbance is a visual field obstacle appearing in a plurality of time-series images, the image processing method further comprising:

storing a plurality of images arranged in time series;
obtaining a motion vector for each of a plurality of relevant images adjacent to a predetermined processing target image based on the processing target image in the plurality of images;
detecting a revision region having the motion vector being equal to or greater than a threshold value from the processing target image;
setting a revision motion vector being less than the threshold value in the revision region;
performing motion correction of the plurality of relevant images based on the motion vectors;
performing averaging processing of pixel values of the plurality of relevant images having been subjected to the motion correction and the processing target image; and
generating a synthetic image corresponding to the processing target image.

25. An image processing method of removing noise caused by disturbance during image capture from a captured image by image processing, the image processing method comprising:
inputting a plurality of temporally continuous captured images;
extracting an image feature related to the disturbance in the captured image; and
suppressing influence of the disturbance on the captured image in accordance with the feature related to the disturbance,
wherein the disturbance is a weather condition during image capture, the image processing method further comprising:
extracting an image feature related to the weather condition in the captured image;
inputting a peripheral sound acquired during capture of the captured image;
extracting a sound feature related to a weather condition in the peripheral sound;
determining a weather condition during capture of the captured image based on the image feature and the sound feature, and
performing image processing based on the determined weather condition to thereby remove noise in the captured image.

26. An image processing method of removing noise caused by disturbance during image capture from a captured image by image processing, the image processing method comprising:
inputting a plurality of temporally continuous captured images;
extracting an image feature related to the disturbance in the captured image; and
suppressing influence of the disturbance on the captured image in accordance with the feature related to the disturbance,
wherein a correction image to be shown on a screen is generated by performing image shift of image blur occurring as the disturbance in continuously captured images,
the image processing method further comprising:
setting, when a portion having the correction image of a present frame not shown therein by the image blur correction is generated with respect to a region of the correction image of a previous frame shown on the screen, the portion to be an out-of-correction image region;
storing the out-of-correction image regions sequentially; and
applying gradation to the plurality of out-of-correction image regions;
generating a synthetic image constituted by the correction image and an out-of-region image which is out of a region of the correction image so that the synthetic image is shown on the screen; and
generating a synthetic image constituted by out-of-region images obtained by applying gradation to the plurality of out-of-correction image regions and the correction image so that the synthetic image is shown on the screen.

* * * * *